(12) United States Patent
Wirt et al.

(10) Patent No.: US 11,071,981 B2
(45) Date of Patent: Jul. 27, 2021

(54) ANALYSIS DEVICE AND METHOD FOR TESTING A SAMPLE

(71) Applicant: Boehringer Ingelheim Vetmedica GmbH, Ingelheim am Rhein (DE)

(72) Inventors: Rene Wirt, Wuppertal (DE); Ursula Amberg, Moenchengladbach (DE); Guenter Bruckmann, Wuerselen (DE); Axel Niemeyer, Bielefeld (DE); Andreas Ostgathe, Solingen (DE); Harald Pauls, Eschweiler (DE); Hannah Schmolke, Braunschweig (DE)

(73) Assignee: BOEHRINGER INGELHEIM VETMEDICA GMBH, Ingelheim am Rhein (DE)

(*) Notice: Subject to any disclaimer, the term of this patent is extended or adjusted under 35 U.S.C. 154(b) by 463 days.

(21) Appl. No.: 15/725,342

(22) Filed: Oct. 5, 2017

(65) Prior Publication Data
US 2018/0099281 A1    Apr. 12, 2018

(30) Foreign Application Priority Data
Oct. 7, 2016 (EP) .................................. 16020380

(51) Int. Cl.
*B01L 3/00* (2006.01)
*G01N 35/00* (2006.01)

(52) U.S. Cl.
CPC ... *B01L 3/502753* (2013.01); *B01L 3/502738* (2013.01); *G01N 35/00029* (2013.01); *B01L 2300/0681* (2013.01); *B01L 2300/087* (2013.01); *B01L 2300/0809* (2013.01); *B01L 2300/0883* (2013.01); *B01L 2400/0605* (2013.01); *B01L 2400/0638* (2013.01)

(58) Field of Classification Search
None
See application file for complete search history.

(56) References Cited

U.S. PATENT DOCUMENTS

| | | | |
|---|---|---|---|
| 5,096,669 | A | 3/1992 | Lauks et al. |
| 5,142,781 | A | 9/1992 | Mettner et al. |
| 6,742,544 | B2 | 6/2004 | Bergh et al. |
| 7,192,001 | B2 | 3/2007 | Wise et al. |
| 8,716,007 | B2 | 5/2014 | Battrell et al. |
| 8,747,776 | B2 | 6/2014 | Yoon et al. |
| 9,110,044 | B2 | 8/2015 | Gumbrecht et al. |
| 9,630,177 | B2 | 4/2017 | Stern et al. |
| 9,709,179 | B2 | 7/2017 | Friedrich et al. |
| 2002/0042140 | A1 | 4/2002 | Hagemeyer et al. |
| 2002/0100503 | A1* | 8/2002 | Browne ............. F16K 7/12 137/331 |

(Continued)

FOREIGN PATENT DOCUMENTS

GB    2516671 A    2/2015
GB    2516675 A    2/2015

*Primary Examiner* — Kathryn Wright
(74) *Attorney, Agent, or Firm* — David S. Safran; Roberts Calderon Safran & Cole, P.C.

(57) ABSTRACT

An analysis device and method for testing a biological sample using a receivable cartridge having at least one actuator for actuating a valve of the cartridge. The actuator has a pneumatically loaded membrane and an actuation element that is coupled to the membrane, the return movement into an unactuated position being performed preferably as a result of restoring forces of the membrane.

19 Claims, 12 Drawing Sheets

(56) References Cited

U.S. PATENT DOCUMENTS

| | | | | |
|---|---|---|---|---|
| 2002/0124897 A1* | 9/2002 | Bergh | ............... | F16K 99/0059 |
| | | | | 137/885 |
| 2015/0204450 A1* | 7/2015 | Tuccelli | ............... | B01L 3/567 |
| | | | | 251/7 |
| 2017/0197213 A1* | 7/2017 | Nielsen | ............... | B01F 13/0818 |
| 2018/0078937 A1* | 3/2018 | Rensch | ............... | G01N 35/10 |

* cited by examiner

ANALYSIS DEVICE AND METHOD FOR TESTING A SAMPLE

BACKGROUND OF THE INVENTION

Field of the Invention

The present invention relates to an analysis device and method for testing a biological sample by means of a receivable cartridge.

Preferably, the present invention deals with analyzing and testing a preferably biological sample, in particular from a human or animal, particularly preferably for analytics and diagnostics, for example with regard to the presence of diseases and/or pathogens and/or for determining blood counts, antibodies, hormones, steroids or the like. Therefore, the present invention is in particular within the field of bioanalytics. A food sample, environmental sample or another sample may optionally also be tested, in particular for environmental analytics or food safety and/or for detecting other substances.

Preferably, by means of the cartridge, at least one analyte (target analyte) of a sample can be determined, identified or detected. In particular, the sample can be tested for qualitatively or quantitatively determining at least one analyte, for example, in order for it to be possible to detect or identify a disease and/or pathogen.

Within the meaning of the present invention, analytes are in particular nucleic-acid sequences, in particular DNA sequences and/or RNA sequences, or proteins, in particular antigens and/or antibodies. In particular, by means of the present invention, nucleic-acid sequences or proteins can be determined, identified or detected as the analytes of a sample. More particularly preferably, the present invention deals with systems, devices and other apparatus for carrying out a nucleic-acid assay for detecting or identifying a nucleic-acid sequence or a protein assay for detecting or identifying a protein.

The present invention deals in particular with what are known as point-of-care systems, i.e., in particular with mobile systems, devices and other apparatus, and deals with methods for carrying out tests on a sample at the sampling site and/or independently or away from a central laboratory or the like. Preferably, point-of-care systems can be operated autonomously and/or independently of a mains network for supplying electrical power.

Description of Related Art

U.S. Pat. No. 5,096,669 discloses a point-of-care system for testing a biological sample, in particular a blood sample. The system comprises a single-use cartridge and an analysis device. Once the sample has been received, the cartridge is inserted into the analysis device in order to carry out the test. The cartridge comprises a microfluidic system and a sensor apparatus comprising electrodes, which apparatus is calibrated by means of a calibration liquid and is then used to test the sample.

Furthermore, International Patent Application Publication WO 2006/125767 A1 and corresponding U.S. Pat. No. 9,110,044 B2 disclose a point-of-care system for integrated and automated DNA or protein analysis, comprising a single-use cartridge and an analysis device for fully automatically processing and evaluating molecular-diagnostic analyses using the single-use cartridge. The cartridge is designed to receive a sample, in particular blood, and in particular allows cell disruption, PCR and detection of PCR amplification products, which are bonded to capture molecules and provided with a label enzyme, in order for it to be possible to detect bonded PCR amplification products or nucleic-acid sequences as target analytes in what is known as a redox cycling process.

UK Patent Application Publication GB 2516675 A discloses a fluidic cartridge for analysing a biological sample. The cartridge comprises mechanically actuated valves which are actuated by deflecting a flexible membrane with a mechanical actuator, i.e., the membrane is mechanically actuated.

UK Patent Application Publication GB 2516671 A discloses a fluidic cartridge for analysing a biological sample. The cartridge comprises mechanically actuated valves which are actuated by deflecting a flexible membrane with a mechanical actuator, i.e., the membrane is mechanically actuated.

U.S. Pat. No. 9,630,177 B2 discloses a microfluidic device and system for sample preparation and/or analysis. The microfluidic device comprises a valve which is actuated by applying to a flexible valve membrane a pressure mechanically by pins or pneumatically, so that said membrane is deflected. The pins can be actuated by pneumatic cylinders. Thus, the valve membrane is mechanically actuated.

U.S. Pat. No. 9,709,179 B2 discloses a device for controlling fluid flows in lab-on-a-chip systems. A recess or flow channel can be closed by pressing a plunger on an elastomer compound, so that said compound is deformed and expands into the recess or flow channel, thereby closing the recess or flow channel.

SUMMARY OF THE INVENTION

In point-of-care systems, it is important that the analysis devices used are constructed in a simple and robust manner.

The problem addressed by the present invention is to provide an analysis device and method for testing a sample, wherein a simple, robust and/or cost-effective construction is made possible or facilitated.

The above problem is solved by an analysis device and a method as described herein.

According to one aspect of the present invention, the analysis device comprises at least one actuator for mechanically actuating a valve of a cartridge, the actuator comprising a pneumatically loaded membrane and an actuation element that is coupled to said membrane and can be moved in a movement direction. Particularly preferably, the membrane holds and/or guides the actuation element and/or is elastically such that the actuation element can be returned to an in particular unactuated position. This provides for very simple, robust and/or cost-effective construction, in particular when a plurality of actuators for actuating, in particular independently, a plurality of valves of the cartridge are provided.

According to another aspect of the present invention, the preferred method for testing a sample in an analysis device by means of a receivable cartridge or in any other sample container uses at least one actuator with a movable actuation element for mechanically actuating at least one valve of the cartridge or container, wherein the actuation element is moved in an actuation direction by pneumatically deforming a membrane which preferably holds or drives the actuation element. This allows a very simple, robust and/or cost-effect construction and/or reliable operation.

Particularly preferably, the analysis device comprises a common pressurized gas supply for all of the actuators. This allows a simple and cost-effective construction.

According to a further aspect of the present invention, which can be realized independently, the actuator for actuating at least one valve on the cartridge is operated pneumatically and the analysis device comprises a pneumatically operated apparatus for mounting positioning and/or clamping the cartridge. This allows a very simple, robust and/or cost-effect construction and/or reliable operation.

The analysis device preferably further comprises a housing that can be opened and/or closed pneumatically. This provides for a simple and cost-effective implementation because the pressurized gas supply can be shared.

The analysis device preferably comprises a pneumatically defined apparatus for mounting, positioning and/or clamping the cartridge. In turn, this makes it possible to utilise the common pressurized gas supply, and therefore a simple and cost-effective construction is made possible. This also allows the analysis device to have a very robust construction.

The term "analysis device" is preferably understood to mean an instrument which is in particular mobile and/or can be used on site, which is designed to chemically, biologically and/or physically test and/or analyse a sample or a component thereof, this taking place in and/or by means of the cartridge. The analysis device controls the testing of the sample in the cartridge. In order to carry out the test, the cartridge can be connected to and in particular received in the analysis device.

The term "cartridge" is preferably understood to mean a structural apparatus or unit designed to receive, to store, to physically, chemically and/or biologically treat and/or prepare and/or to measure a sample, preferably in order to make it possible to detect, identify or determine at least one analyte, in particular a protein and/or a nucleic-acid sequence, of the sample.

A cartridge within the meaning of the present invention preferably comprises a fluid system having a plurality of channels, cavities and/or valves for controlling the flow through the channels and/or cavities.

In particular, within the meaning of the present invention, a cartridge is designed to be at least substantially planar and/or card-like, in particular is designed as a (micro)fluidic card and/or is designed as a main body or container that can preferably be closed and/or said cartridge can be inserted and/or plugged into a proposed analysis device when it contains the sample.

The above-mentioned aspects and features of the present invention and the aspects and features of the present invention will become apparent from the following description can in principle be implemented independently from one another, but also in any combination or order.

Other aspects, advantages, features and properties of the present invention will become apparent from the following description of a preferred embodiment with reference to the accompanying drawings.

DETAILED DESCRIPTION OF THE INVENTION

In the figures, the same reference signs are used for the same or similar parts and components, corresponding or comparable properties and advantages being achieved even if these are not repeatedly described.

Figure 1:
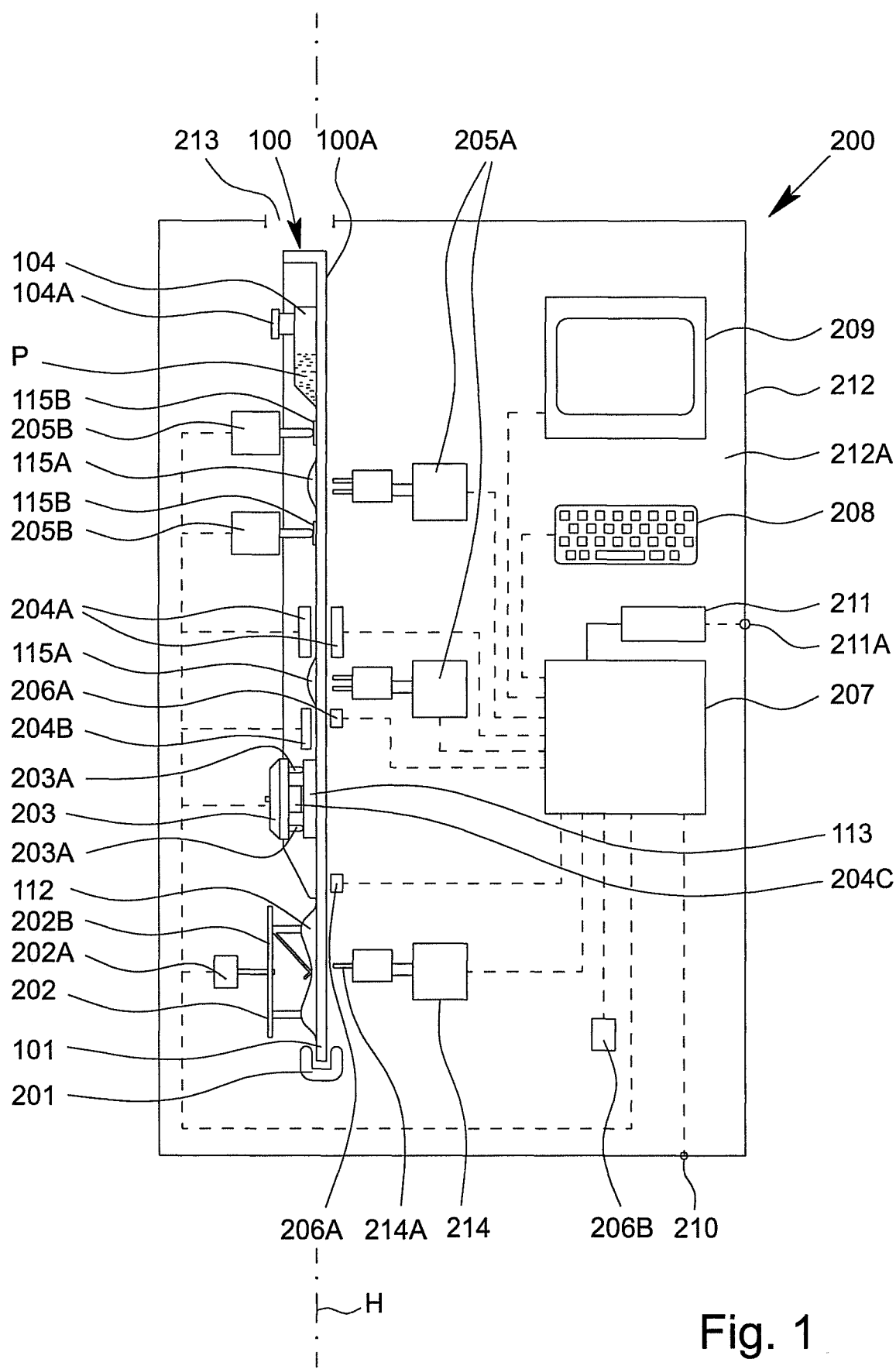
FIG. 1 is a schematic view of a proposed analysis device and a cartridge received in the analysis device.

FIG. 1 is a highly schematic view of a proposed analysis device comprising an apparatus or cartridge 100 for testing an in particular biological sample P.

Figure 2:
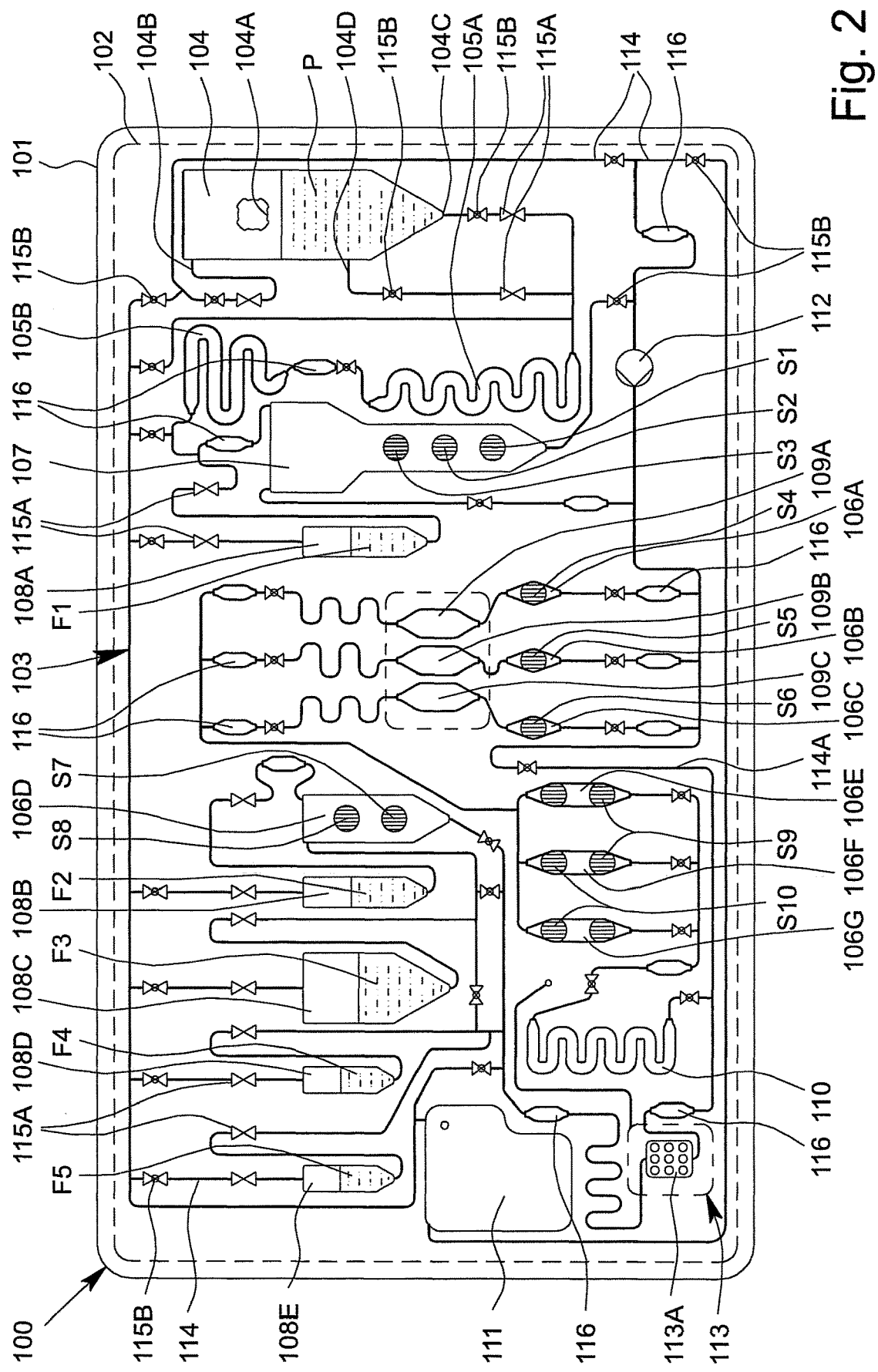
FIG. 2 is a schematic view of the cartridge.

FIG. 2 is a schematic view of a preferred embodiment of the apparatus or cartridge 100 for testing the sample P. The apparatus or cartridge 100 in particular forms a handheld unit, and in the following is merely referred to as a cartridge 100.

The term "sample" is preferably understood to mean the sample material to be tested, which is in particular taken from a human or animal. In particular, within the meaning of the present invention, a sample is a fluid, such as saliva, blood, urine or another liquid, preferably from a human or animal, or a component thereof. Within the meaning of the present invention, a sample may be pre-treated or prepared if necessary, or may come directly from a human or animal or the like, for example. A food sample, environmental sample or another sample may optionally also be tested, in particular for environmental analytics, food safety and/or for detecting other substances, preferably natural substances, but also biological or chemical warfare agents, poisons or the like.

A sample within the meaning of the present invention preferably contains one or more analytes, it preferably being possible for the analytes to be identified or detected, in particular qualitatively and/or quantitatively determined. Particularly preferably, within the meaning of the present invention, a sample has target nucleic-acid sequences as the analytes, in particular target DNA sequences and/or target RNA sequences, and/or target proteins as the analytes, in particular target antigens and/or target antibodies. Particularly preferably, at least one disease and/or pathogen can be detected or identified in the sample P by qualitatively and/or quantitatively determining the analytes.

Preferably, the analysis device 200 controls the testing of the sample P in particular in or on the cartridge 100 and/or is used to evaluate the testing and/or to collect, to process and/or to store measured values from the test.

By means of the analysis device 200 and/or by means of the cartridge 100 and/or using the method for testing the sample P, an analyte of the sample P, or particularly preferably a plurality of analytes of the sample P, can preferably be determined, identified or detected. Said analytes are in particular detected and/or measured not only qualitatively, but, alternatively or additionally, particularly preferably also quantitatively.

Therefore, the sample P can in particular be tested for qualitatively and/or quantitatively determining at least one analyte, for example, in order for it to be possible to detect or identify a disease and/or pathogen or to determine other values, which are important for diagnostics, for example.

The cartridge 100 is preferably at least substantially planar, flat, plate-shaped and/or card-shaped.

The cartridge 100 preferably comprises, in particular, an at least substantially planar, flat, plate-shaped and/or card-like main body or support 101, the main body or support 101 in particular being made of and/or injection-molded from plastics material, particularly preferably polypropylene.

The cartridge 100 preferably comprises at least one film or cover 102 for covering the main body 101 and/or cavities and/or channels formed therein at least in part, in particular on the front, and/or for forming valves or the like, as shown by dashed lines in FIG. 2.

The cartridge 100 and/or the main body 101 thereof, in particular together with the cover 102, preferably forms and/or comprises a fluidic system 103, referred to in the following as the fluid system 103.

The cartridge 100, the main body 101 and/or the fluid system 103 are preferably at least substantially vertically oriented in the operating position and/or during the test, in particular in the analysis device 200, as shown schematically in FIG. 1. In particular, the surface extension or main plane H of the cartridge 100 thus extends at least substantially vertically in the operating position.

The cartridge 100 and/or the fluid system 103 preferably comprises a plurality of cavities, in particular at least one receiving cavity 104, at least one metering cavity 105, at least one intermediate cavity 106, at least one mixing cavity 107, at least one storage cavity 108, at least one reaction cavity 109, at least one intermediate temperature-control cavity 110 and/or at least one collection cavity 111, the cavities preferably being fluidically interconnected by a plurality of channels.

Within the meaning of the present invention, channels are preferably elongate forms for conducting a fluid in a main flow direction, the forms preferably being closed transversely, in particular perpendicularly, to the main flow direction and/or longitudinal extension, preferably on all sides.

In particular, the main body 101 comprises elongate notches, recesses, depressions or the like, which are closed at the sides by the cover 102 and form channels within the meaning of the present invention.

Within the meaning of the present invention, cavities or chambers are preferably formed by recesses, depressions or the like in the cartridge 100 or main body 101, which are closed or covered by the cover 102, in particular at the sides. The volume or space enclosed by each cavity is preferably fluidically linked, in particular to the fluid system 103, by means of channels.

In particular, within the meaning of the present invention, a cavity comprises at least two openings for the inflow and/or outflow of fluids.

Within the meaning of the present invention, cavities preferably have a larger diameter and/or flow cross section than channels, preferably by at least a factor of 2, 3 or 4. In principle, however, cavities may in some cases also be elongate, in a similar manner to channels.

The cartridge 100 and/or the fluid system 103 also preferably comprises at least one pump apparatus 112 and/or at least one sensor arrangement or sensor apparatus 113.

In the example shown, the cartridge 100 or the fluid system 103 preferably comprises two metering cavities 105A and 105B, a plurality of intermediate cavities 106A to 106G, a plurality of storage cavities 108A to 108E and/or a plurality of reaction cavities 109, which can preferably be loaded separately from one another, in particular a first reaction cavity 109A, a second reaction cavity 109B and an optional third reaction cavity 109C, as can be seen in FIG. 2.

The metering cavities 105 are preferably designed to receive, to temporarily store and/or to meter the sample P, and/or to pass on said sample P in a metered manner. Particularly preferably, the metering cavities 105 have a diameter which is larger than that of the (adjacent) channels.

In the initial state of the cartridge 100 or when at the factory, the storage cavities 108 are preferably filled at least in part, in particular with a liquid such as a reagent, solvent or wash buffer.

The collection cavity 111 is preferably designed to receive larger quantities of fluids that are in particular used for the test, such as sample residues or the like. Preferably, in the initial state or when at the factory, the collection cavity 111 is empty or filled with gas, in particular air. The volume of the collection cavity 111 corresponds to or exceeds preferably the (cumulative) volume of the storage cavity/cavities 108 or the liquid content thereof and/or the volume of the receiving cavity 104 or the sample P received.

The reaction cavity/cavities 109 is/are preferably designed to allow a substance located in the reaction cavity 109 to react when an assay is being carried out.

The reaction cavity/cavities 109 is/are used in particular to carry out an amplification reaction, in particular PCR, or several, preferably different, amplification reactions, in particular PCRs. It is preferable to carry out several, preferably different, PCRs, i.e., PCRs having different primer combinations or primer pairs, in parallel and/or independently and/or in different reaction cavities 109.

"PCR" stands for polymerase chain reaction and is a molecular-biological method by means of which certain analytes, in particular portions of RNA or RNA sequences or DNA or DNA sequences, of a sample P are amplified, preferably in several cycles, using polymerases or enzymes, in particular in order to then test and/or detect the amplification products or nucleic-acid products. If RNA is intended to be tested and/or amplified, before the PCR is carried out, a cDNA is produced starting from the RNA, in particular using reverse transcriptase. The cDNA is used as a template for the subsequent PCR.

The amplification products, target nucleic-acid sequences and/or other portions of the sample P produced in one or more reaction cavities 109 can be conducted or fed to the connected sensor arrangement or sensor apparatus 113, in particular by means of the pump apparatus 112.

The sensor arrangement or sensor apparatus 113 is used in particular for detecting, particularly preferably qualitatively and/or quantitatively determining, the analyte or analytes of the sample P, in this case particularly preferably the target nucleic-acid sequences and/or target proteins as the analytes. Alternatively or additionally, however, other values may also be collected and/or determined.

The sensor apparatus 113 preferably comprises a sensor array 113A in order for it to be possible to determine or detect in particular a plurality of analytes.

In particular, the sensor apparatus 113 or sensor array 113A comprises capture molecules (not shown) in order for it to be possible to bond analytes and/or amplification products and subsequently detect, identify or determine said analytes and/or amplification products in a detection process.

Preferably, electrochemical detection is carried out.

The cartridge 100, the main body 101 and/or the fluid system 103 preferably comprise a plurality of channels 114 and/or valves 115, as shown in FIG. 2.

By means of the channels 114 and/or valves 115, the cavities 104 to 111, the pump apparatus 112 and/or the sensor arrangement or sensor apparatus 113 can be temporarily and/or permanently fluidically interconnected and/or fluidically separated from one another, as required and/or optionally or selectively, in particular such that they are controlled by the analysis device 200.

The cavities 104 to 111 are preferably each fluidically linked or interconnected by a plurality of channels 114. Particularly preferably, each cavity is linked or connected by at least two associated channels 114, in order to make it possible for fluid to fill, flow through and/or drain from the respective cavities as required.

The fluid transport or the fluid system 103 is preferably not based on capillary forces, or is not exclusively based on said forces, but in particular is essentially based on the effects of gravity and/or pumping forces and/or compressive forces and/or suction forces that arise, which are particularly preferably generated by the pump or pump apparatus 112. In this case, the flows of fluid or the fluid transport and the metering are controlled by accordingly opening and closing the valves 115 and/or by accordingly operating the pump or pump apparatus 112, in particular by means of a pump drive 202 of the analysis device 200.

Preferably, each of the cavities 104 to 110 has an inlet at the top and an outlet at the bottom in the operating position. Therefore, if required, only liquid from the respective cavities can be removed via the outlet.

In the operating position, the liquids from the respective cavities are preferably removed, in particular drawn out, via the outlet that is at the bottom in each case, it preferably being possible for gas or air to flow and/or be pumped into the respective cavities via the inlet that is in particular at the top. In particular, relevant vacuums in the cavities can thus be prevented or at least minimized when conveying the liquids.

In particular, the cavities, particularly preferably the storage cavity/cavities 108, the mixing cavity 107 and/or the receiving cavity 104, are each dimensioned and/or oriented in the normal operating position such that, when said cavities are filled with liquid, bubbles of gas or air that may potentially form rise upwards in the operating position, such that the liquid collects above the outlet without bubbles. However, other solutions are also possible here.

The receiving cavity 104 preferably comprises a connection 104A for introducing the sample P. In particular, the sample P may for example, be introduced into the receiving cavity 104 and/or cartridge 100 via the connection 104A by means of a pipette, syringe or other instrument.

The receiving cavity 104 preferably comprises an inlet 104B, an outlet 104C and an optional intermediate connection 104D, it preferably being possible for the sample P or a portion thereof to be removed and/or conveyed further via the outlet 104C and/or the optional intermediate connection 104D. Gas, air or another fluid can flow in and/or be pumped in via the inlet 104B, as already explained.

Preferably, the sample P or a portion thereof can be removed, optionally and/or depending on the assay to be carried out, via the outlet 104C or the optional intermediate connection 104D of the receiving cavity 104. In particular, a supernatant of the sample P, such as blood plasma or blood serum, can be conducted away or removed via the optional intermediate connection 104D, in particular for carrying out the protein assay.

Preferably, at least one valve 115 is assigned to each cavity, the pump apparatus 112 and/or the sensor apparatus 113 and/or is arranged upstream of the respective inlets and/or downstream of the respective outlets.

Preferably, the cavities 104 to 111 or sequences of cavities 104 to 111, through which fluid flows in series or in succession for example, can be selectively released and/or fluid can selectively flow there-through by the assigned valves 115 being actuated, and/or said cavities can be fluidically connected to the fluid system 103 and/or to other cavities.

In particular, the valves 115 are formed by the main body 101 and the film or cover 102 and/or are formed therewith and/or are formed in another manner, for example, by or having additional layers, depressions or the like.

Particularly preferably, one or more valves 115A are provided which are preferably tightly closed initially or in the storage state, particularly preferably in order to seal liquids or liquid reagents F, located in the storage cavities 108, and/or the fluid system 103 from the open receiving cavity 104 in a storage-stable manner.

Preferably, an initially closed valve 115A is arranged upstream and downstream of each storage cavity 108. Said valves are preferably only opened, in particular automatically, when the cartridge 100 is actually being used and/or during or after inserting the cartridge 100 into the analysis device 200 and/or for carrying out the assay.

A plurality of valves 115A, in particular three valves in this case, are preferably assigned to the receiving cavity 104, in particular if the intermediate connection 104D is provided in addition to the inlet 104B and the outlet 104C. Depending on the use, in addition to the valve 115A on the inlet 104B, then preferably only the valve 115A either at the outlet 104C or at the intermediate connection 104D is opened.

The valves 115A assigned to the receiving cavity 104 seal the fluid system 103 and/or the cartridge 100 in particular fluidically and/or in a gas-tight manner, preferably until the sample P is inserted or introduced and/or the receiving cavity 104 or the connection 104A of the receiving cavity 104 is closed.

As an alternative or in addition to the valves 115A (which are initially closed), one or more valves 115B are preferably provided which are not closed in a storage-stable manner and/or which are open initially or in an inoperative position, in an initial state or when the cartridge 100 is not inserted into the analysis device 200, and/or which can be closed by actuation. These valves 115B are used in particular to control the flows of fluid during the test.

The cartridge 100 is preferably designed as a microfluidic card and/or the fluid system 103 is preferably designed as a microfluidic system. In the present invention, the term "microfluidic" is preferably understood to mean that the respective volumes of individual cavities, some of the cavities or all of the cavities 104 to 111 and/or channels 114 are, separately or cumulatively, less than 5 ml or 2 ml, particularly preferably less than 1 ml or 800 μl, in particular less than 600 μl or 300 μl, more particularly preferably less than 200 μl or 100 μl.

Particularly preferably, a sample P having a maximum volume of 5 ml, 2 ml or 1 ml can be introduced into the cartridge 100 and/or the fluid system 103, in particular the receiving cavity 104.

Reagents and liquids which are preferably introduced or provided before the test in liquid form as liquids or liquid reagents F and/or in dry form as dry reagents S are required for testing the sample P, as indicated in the schematic view according to FIG. 2 by reference signs F1 to F5 and S1 to S10.

Furthermore, other liquids F, in particular in the form of a wash buffer, solvent for dry reagents S and/or a substrate, for example, in order to form detection molecules and/or a redox system, are also preferably required for the test, the detection process and/or for other purposes, and are in particular provided in the cartridge 100, i.e., are likewise introduced before use, in particular before delivery. At some points in the following, a distinction is not made between liquid reagents and other liquids, and therefore the respective explanations are accordingly also mutually applicable.

The cartridge 100 preferably contains all the reagents and liquids required for pretreating the sample P and/or for carrying out the test or assay, in particular for carrying out one or more amplification reactions or PCRs, and therefore, particularly preferably, it is only necessary to receive the optionally pretreated sample P.

The cartridge 100 or the fluid system 103 preferably comprises a bypass 114A that can optionally be used, in order for it to be possible, if necessary, to conduct or convey the sample P or components thereof past the reaction cavities 109 and/or, by bypassing the optional intermediate temperature-control cavity 110, also directly to the sensor apparatus 113.

The cartridge 100, the fluid system 103 and/or the channels 114 preferably comprise sensor portions 116 or other apparatus for detecting liquid fronts and/or flows of fluid.

It is noted that various components, such as the channels 114, the valves 115, in particular the valves 115A that are initially closed and the valves 115B that are initially open, and the sensor portions 116 in FIG. 2 are, for reasons of clarity, only labelled in some cases, but the same symbols are used in FIG. 2 also for each of these components.

The collection cavity 111 is preferably used for receiving excess or used reagents and liquids and volumes of the sample, and/or for providing gas or air in order to empty individual cavities and/or channels. In the initial state, the collection cavity 111 is preferably filled solely with gas, in particular air.

In particular, the collection cavity 111 can optionally be connected to individual cavities and channels 114 or other apparatus fluidically in order to remove reagents and liquids from said cavities, channels or other apparatus and/or to replace said reagents and liquids with gas or air. The collection cavity 111 is preferably given appropriate large dimensions.

Figure 3:
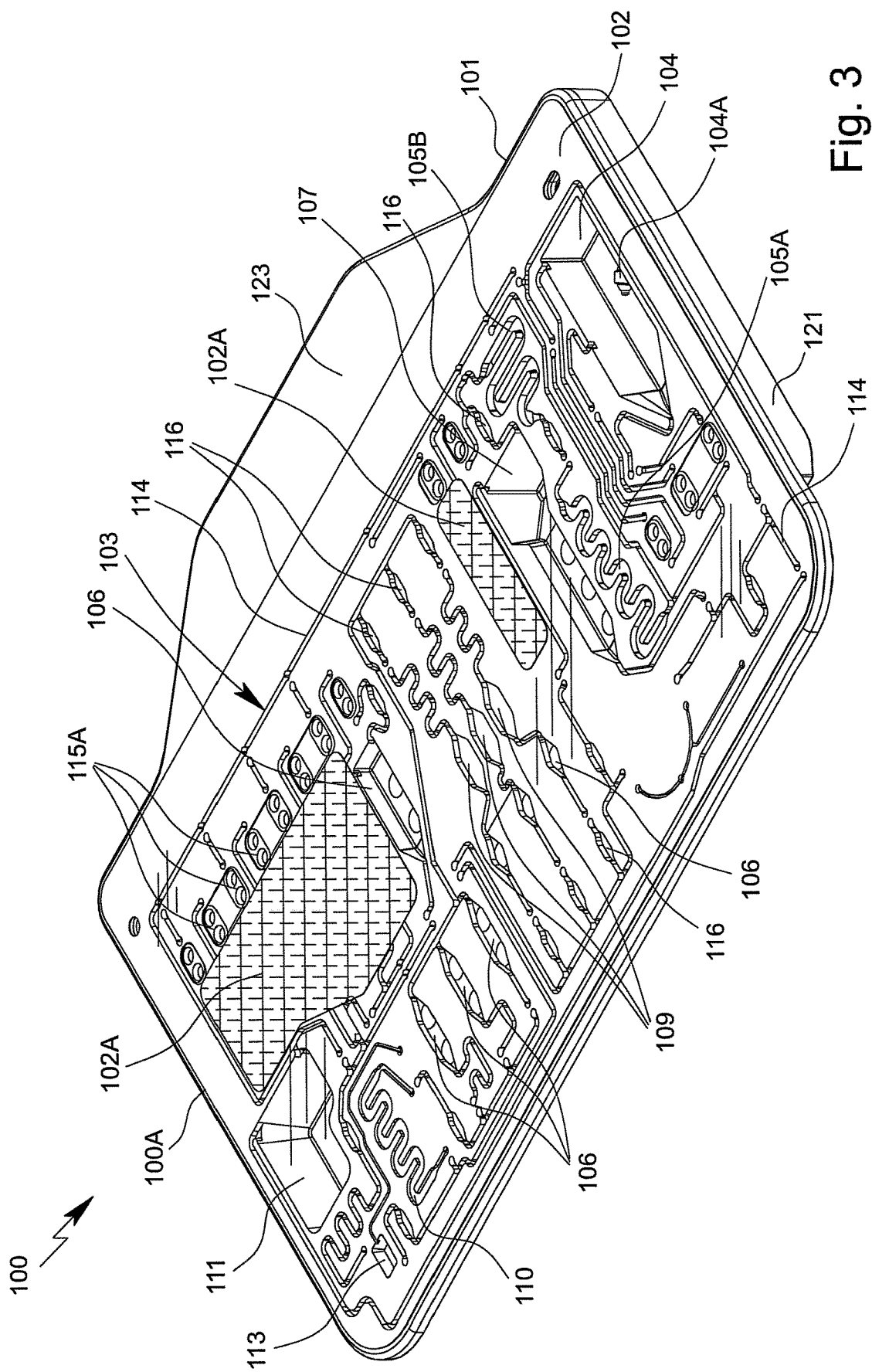
FIG. 3 is a schematic perspective front view of the cartridge.
Figure 4:
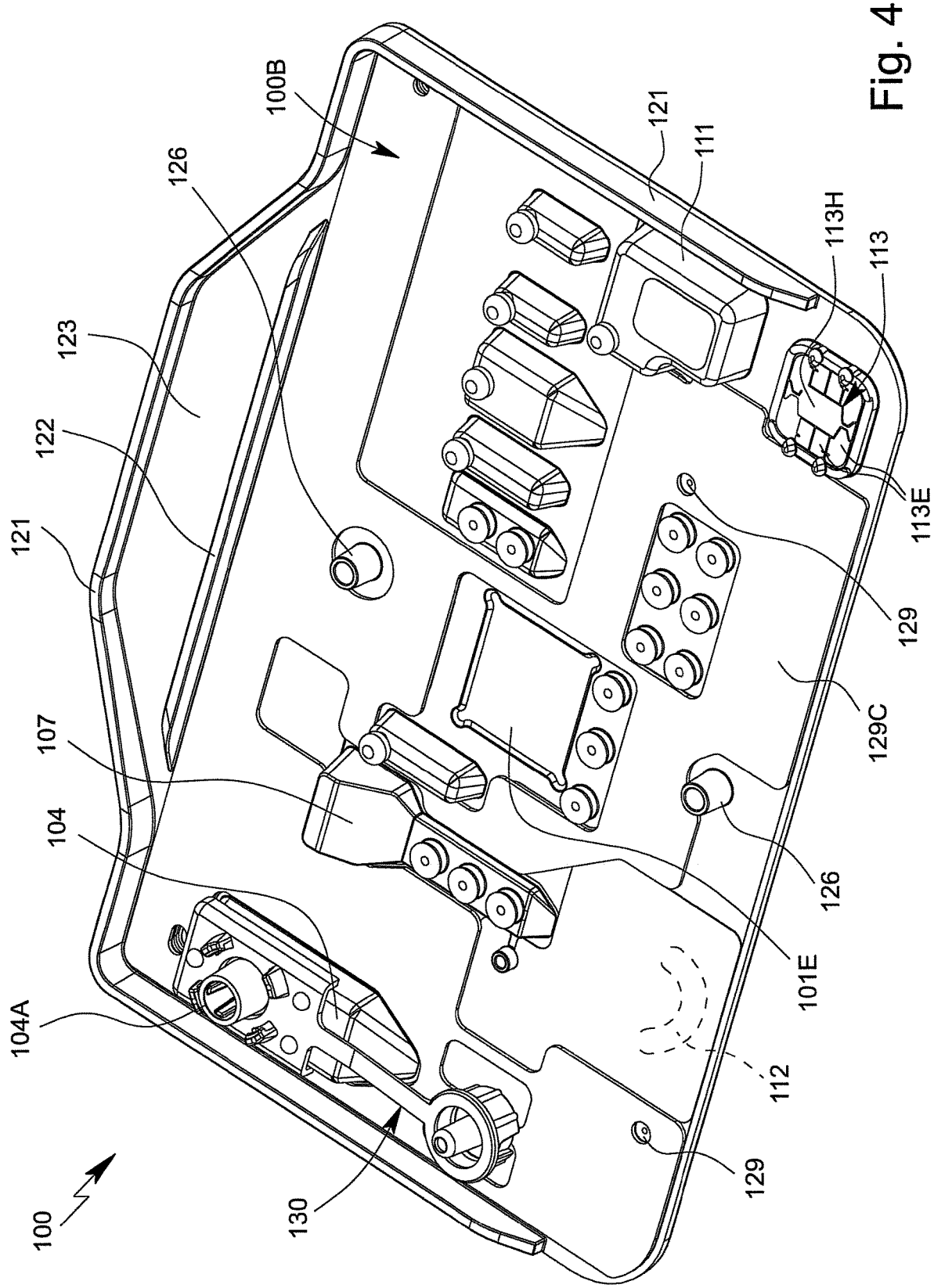
FIG. 4 is a schematic perspective rear view of the cartridge.

FIG. 3 is a perspective front view of the cartridge 100 and FIG. 4 is a perspective rear view thereof, i.e., of the back 100B thereof.

In order to achieve particularly good storage stability of the liquid reagent(s) F, the cover 102 is preferably produced from or additionally covered by an inorganic material, in particular metal, particularly preferably aluminum, preferably in the region of at least one storage cavity 108. This is preferably achieved by applying or adhesively bonding a piece of material or film sheet, consisting of or produced from the corresponding material, as an additional cover 102A in the region of the respective storage cavities 108, as shown schematically in FIG. 3.

As shown in FIG. 4, the sensor apparatus 113 preferably comprises electrical contacts 113E for electrically connecting the cartridge 100 and/or sensor apparatus 113.

The contacts 113E are arranged in particular on the flat side and/or back and/or around a central region 113H.

The cartridge 100 and/or the main body 101 preferably comprises a reinforced or angled edge 121 and/or a reinforcing rib 122, particularly preferably on the back 100B, as shown schematically in FIG. 4.

The cartridge 100 or the main body 101 preferably comprises a grip portion 123 in order for it to be possible to optimally grip and/or hold the cartridge 100 by hand. The grip portion 123 is in particular arranged and/or formed or integrally molded on a longitudinal side.

The edge 121 and/or the reinforcing rib 122 are used in particular to provide reinforcement for the cartridge 100 or the main body 101 transversely to the surface extension or plate plane or flat side or back 100B. This is particularly advantageous for making it possible to mount or clamp the cartridge 100 in the analysis device 200 in as defined a manner as possible. The increased rigidity makes it possible, for example, for the sensor arrangement or sensor apparatus 113 to be contacted in a simple or more defined manner and/or improves the effect on the pump apparatus 112.

The cartridge 100 and/or the main body 101 preferably has, in the region of the reaction cavity/cavities 109, a region of reduced wall thickness, a weakened portion or a depression 101E in order to allow or ensure that the reaction cavity/cavities 109 and/or the fluids located therein is/are thermally coupled to the associated reaction temperature-control apparatus 204A in an effective or improved manner.

The cartridge 100 or the main body 101 preferably comprises at least one positioning portion 126, in particular two positioning portions 126 in the example shown, for mounting and/or positioning the cartridge 100 in a defined manner, in particular in the analysis device 200 while a sample P is being tested, as shown in FIG. 4.

The positioning portion 126 is in particular integrally moulded on or formed in one piece with the main body 101.

The positioning portion 126 preferably projects from a flat side, in this case the back 100B, or the plate plane of the cartridge 100 or main body 101.

The positioning portion 126 is in particular cylindrical or hollow cylindrical and/or conical, preferably on the inside and/or outside.

The outside of the positioning portion 126 preferably tapers towards the free end or is conical. This is conducive to simple production and/or centering of the cartridge 100 in the analysis device 200.

The inside of the positioning portion 126 is preferably conical or widens towards the free end. This is conducive to simple production and/or centering of the cartridge 100 in the analysis device 200.

The two positioning portions 126 are preferably arranged in a line that is parallel to a side of the cartridge 100, in particular in a central line that is transverse to a longitudinal side of the cartridge 100.

In particular, in the view according to FIG. 4, one positioning portion 126 is arranged in the region of the lower longitudinal side of the cartridge 100. The other positioning portion 126 is arranged in particular in the vicinity of the optional reinforcing rib 122.

The cartridge 100 or the main body 101 preferably comprises a fluidic and/or pneumatic connection 129. In the example shown, preferably a plurality of connections or two connections 129 are provided.

The connection 129 or each connection 129 is used in particular for fluidically or pneumatically supplying an associated manipulating apparatus or for actuating said manipulating apparatus.

In the example shown, the connection 129 on the left-hand side is assigned in particular to the pump apparatus 112 and is preferably used to pneumatically reset a peristaltic pump formed by the pump apparatus 112.

In the example shown, the connection 129 on the right-hand side is preferably assigned to the sensor apparatus 113 and is used in particular to pneumatically actuate a sensor cover (not shown) in order for it to be possible, if necessary, to make the sensor compartment above the sensor array 113A smaller, in particular during detection.

Each connection 129 is preferably formed by a corresponding opening in the main body 101.

A card-side seal 129C, formed in particular by a suitable layer or film or the like, is preferably assigned to each connection 129. However, other technical solutions are also possible.

The connection 104A of the receiving cavity 104 can be closed after the sample P has been received. The cartridge 100 preferably comprises a closure element 130 for this purpose.

In particular, the connection 104A can be closed in a liquid-tight and particularly preferably also gas-tight manner by the closure element 130. In particular, a closed fluid circuit can thus be formed, with the receiving cavity 104 being included. In particular, once the assigned valves 115A at the inlet 104B, outlet 104C and/or intermediate connection 104D have been opened, the receiving cavity 104 thus forms part of the fluid system 103 of the cartridge 100, wherein the fluid system is preferably closed or can be closed by the closure element 130.

Once the sample P has been introduced into the receiving cavity 104 and the connection 104A has been closed, the cartridge 100 can be inserted into and/or received in the proposed analysis device 200 in order to test the sample P, as shown in FIG. 1.

The analysis device 200 preferably comprises a mount or receptacle 201 for mounting and/or receiving the cartridge 100.

Preferably, the cartridge 100 and/or the fluid system 103 is fluidically, in particular hydraulically, separated or isolated from the analysis device 200. In particular, the cartridge 100 forms a preferably independent and in particular closed or sealed fluidic or hydraulic system 103 for the sample P and the reagents and other liquids. In this way, the analysis device 200 does not come into direct contact with the sample P and/or other fluids and/or reagents and can in particular be reused for another test without being disinfected and/or cleaned first.

It is however provided that the analysis device 200 is connected or coupled mechanically, electrically, thermally and/or fluidically and/or pneumatically to the cartridge 100.

In particular, the analysis device 200 is designed to have a mechanical effect, in particular for actuating the pump apparatus 112 and/or the valves 115, and/or to have a thermal effect, in particular for temperature-controlling the reaction cavity/cavities 109 and/or the intermediate temperature-control cavity 110.

In addition, the analysis device 200 can preferably be pneumatically connected to the cartridge 100, in particular in order to actuate individual apparatus, and/or can be electrically connected to the cartridge 100, in particular in order to collect and/or transmit measured values, for example, from the sensor apparatus 113 and/or sensor portions 116.

The analysis device 200 preferably comprises a pump drive 202, the pump drive 202 in particular being designed for mechanically actuating the pump apparatus 112.

The analysis device 200 preferably comprises a connection apparatus 203 for in particular electrically and/or thermally connecting the cartridge 100 and/or the sensor arrangement or sensor apparatus 113.

As shown in FIG. 1, the connection apparatus 203 preferably comprises a plurality of electrical contact elements 203A, the cartridge 100, in particular the sensor arrangement or sensor apparatus 113, preferably being electrically connected or connectable to the analysis device 200 by the contact elements 203A.

The analysis device 200 preferably comprises one or more temperature-control apparatus 204 for temperature-controlling the cartridge 100 and/or having a thermal effect on the cartridge 100, in particular for heating and/or cooling, the temperature-control apparatus(es) 204 (each) preferably comprising or being formed by a heating resistor or a Peltier element.

Preferably, individual temperature-control apparatus 204, some of these apparatus or all of these apparatus can be positioned against the cartridge 100, the main body 101, the cover 102, the sensor arrangement, sensor apparatus 113 and/or individual cavities and/or can be thermally coupled thereto and/or can be integrated therein and/or can be operated or controlled in particular electrically by the analysis device 200. In the example shown, in particular the temperature-control apparatus 204A, 204B and/or 204C are provided.

The analysis device 200 preferably comprises one or more actuators 205 for actuating the valves 115. Particularly preferably, different (types or groups of) actuators 205A and 205B are provided which are assigned to the different (types or groups of) valves 115A and 115B for actuating each of said valves, respectively.

The analysis device 200 preferably comprises one or more sensors 206. In particular, fluid sensors 206A are assigned to the sensor portions 116 and/or are designed or intended to detect liquid fronts and/or flows of fluid in the fluid system 103.

Particularly preferably, the fluid sensors 206A are designed to measure or detect, in particular in a contact-free manner, for example, optically and/or capacitively, a liquid front, flow of fluid and/or the presence, the speed, the mass flow rate/volume flow rate, the temperature and/or another value of a fluid in a channel and/or a cavity, in particular in a respectively assigned sensor portion 116, which is in particular formed by a planar and/or widened channel portion of the fluid system 103.

Alternatively, or additionally, the analysis device 200 preferably comprises one or more (other or additional) sensors 206B for detecting the ambient temperature, internal temperature, atmospheric humidity, position, and/or alignment, for example, by means of a GPS sensor, and/or the orientation and/or inclination of the analysis device 200 and/or the cartridge 100.

The analysis device 200 preferably comprises a control apparatus 207, in particular comprising an internal clock or time base for controlling the sequence of a test or assay and/or for collecting, evaluating and/or outputting or providing measured values in particular from the sensor apparatus 113, and/or from test results and/or other data or values.

The control apparatus 207 preferably controls or feedback controls the pump drive 202, the temperature-control apparatus 204 and/or actuators 205, in particular taking into account or depending on the desired test and/or measured values from the sensor arrangement or sensor apparatus 113 and/or sensors 206.

Optionally, the analysis device 200 comprises an input apparatus 208, such as a keyboard, a touch screen or the like, and/or a display apparatus 209, such as a screen.

The analysis device 200 preferably comprises at least one interface 210, for example, for controlling, for communicating and/or for outputting measured data or test results and/or for linking to other devices, such as a printer, an external power supply or the like. This may in particular be a wired or wireless interface 210.

The analysis device 200 preferably comprises a power supply 211 for providing electrical power, preferably a battery or an accumulator, which is in particular integrated and/or externally connected or connectable.

Preferably, an integrated accumulator is provided as a power supply 211 and is (re)charged by an external charging device (not shown) via a connection 211A and/or is interchangeable.

The analysis device 200 is preferably portable or mobile. Particularly preferably, the analysis device 200 weighs less than 25 kg or 20 kg, particularly preferably less than 15 kg or 10 kg, in particular less than 9 kg or 6 kg.

The analysis device 200 preferably comprises a housing 212, all the components and/or some or all of the apparatus preferably being integrated in the housing 212 and/or arranged in the interior space 212A thereof.

Particularly preferably, the cartridge 100 can be inserted or slid into the housing 212, and/or can be received by the analysis device 200, through an opening 213 which can in particular be closed, such as a slot or the like.

As already explained, the analysis device 200 can preferably be fluidically and/or pneumatically linked or connected to the cartridge 100, in particular to the sensor arrangement or sensor apparatus 113 and/or to the pump apparatus 112, preferably by means of one or more connections 129.

Particularly preferably, the analysis device 200 is designed to supply the cartridge 100, in particular the sensor arrangement and/or the pump apparatus 112, with a working medium, in particular gas or air.

Preferably, the working medium can be compressed and/or pressurized in the analysis device 200 or by means of the analysis device 200.

The analysis device 200 preferably comprises a pressurized gas supply 214 in order to provide a pressurized working medium, in particular gas or air.

The pressurized gas supply 214 is preferably integrated in the analysis device 200 or the housing 212 and/or can be controlled or feedback controlled by means of the control apparatus 207.

Preferably, the pressurized gas supply 214 is electrically operated or can be operated by electrical power. In particular, the pressurized gas supply 214 can be supplied with electrical power by means of the power supply 211.

The analysis device 200 and/or pressurized gas supply 214 preferably comprises a connection element 214A, in particular in order to pneumatically connect the analysis device 200 and/or pressurized gas supply 214 to the cartridge 100 and/or to the connection 129 or connections 129.

Figure 5:
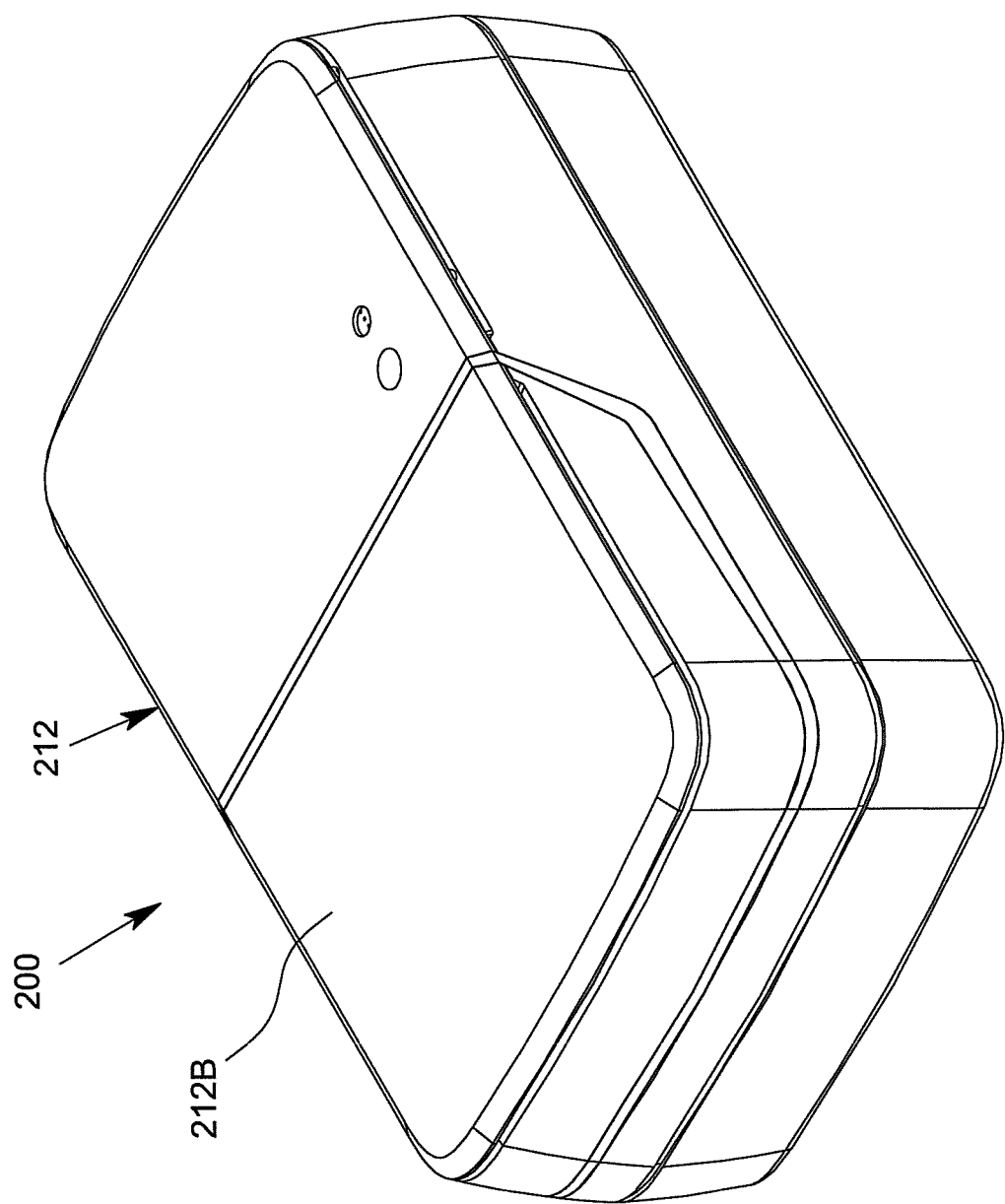
FIG. 5 is a schematic perspective view of the analysis device when the housing is closed.

FIG. 5 is a perspective view of the proposed analysis device 200 in the closed state. The analysis device 200 or housing 212 preferably comprises a housing part 212B that can be opened.

Figure 6:
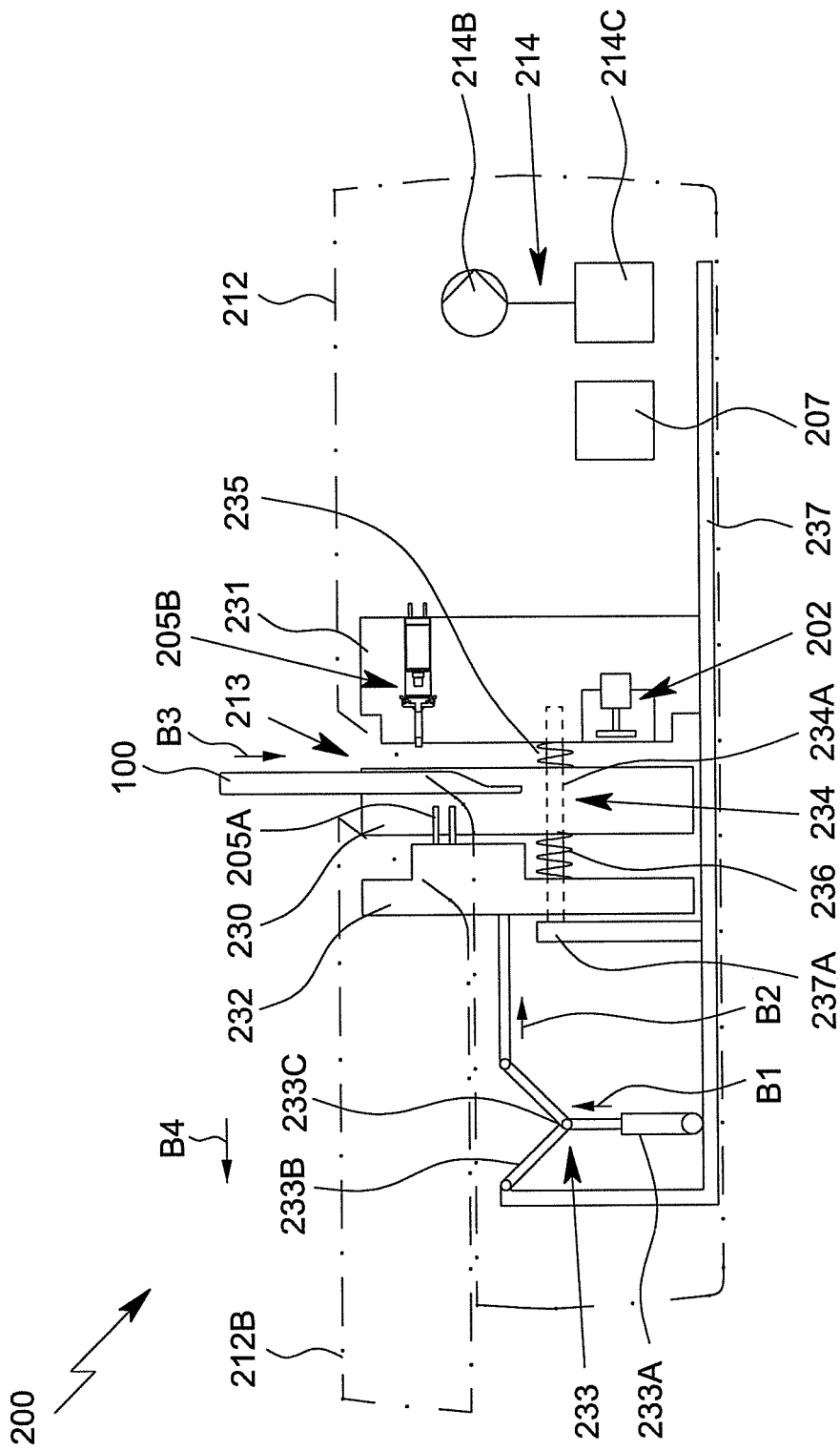
FIG. 6 is a schematic sectional view of the analysis device when the housing is open and the cartridge is received in part.

FIG. 6 is a schematic section through the analysis device in the open state, i.e., when the housing 212 or housing part 212B is open. The opening 213 in the analysis device 200 or housing 212 is therefore open. In this view, the cartridge 100 is inserted into the analysis device 200 in part or received therein in part.

The analysis device 200 and/or pressurized gas supply 214 preferably comprises a compressor 214B, in order to compress, condense and/or pressurise the working medium, in particular gas or air, and optionally comprises an associated pressurized gas storage means 214C, as shown schematically in FIG. 6.

The analysis device 200 is designed to receive, position and/or hold the cartridge 100, in particular such that the cartridge 100 can be held in a clamped manner and/or can be mechanically, electrically, thermally, fluidically and/or pneumatically connected.

The analysis device 200 preferably comprises a receiving unit 230, which is used in particular to receive, position and/or hold the cartridge 100, a connection unit 231, which is used in particular to mechanically, electrically, thermally and/or fluidically connect the cartridge 100, an actuator unit 232 for actuating or forcing one or more valves 115A open, and/or a drive apparatus 233, in particular for moving or actuating the receiving unit 230 and/or actuator unit 232.

The analysis device 200 preferably comprises a pneumatically operated apparatus for holding, mounting, positioning and/or clamping the cartridge 100. In this case, said apparatus is formed in particular by the receiving unit 230, the connection unit 231, the drive apparatus 233, and optionally the actuator unit 232.

The analysis device 200 and/or drive apparatus 233 preferably comprises an in particular pneumatically operated drive 233A, such as a pneumatic cylinder, and/or a gear mechanism 233B.

In the example shown, the gear mechanism 233B is preferably designed as a reduction gear mechanism or a gear mechanism having a variable reduction ratio, particularly preferably designed as a toggle lever mechanism. In particular, the drive 233A acts on the toggle link or joint 233C, as shown in FIG. 6, in order to convert the drive movement in the direction B1 into a driven or actuator movement in the direction B2. However, other structural solutions are also possible.

The direction B1 of the drive movement preferably extends transversely or at least substantially perpendicularly to the direction B2 of the actuator movement and/or an opening direction B4, and/or at least substantially parallel, but preferably in the opposite direction, to a receiving direction B3.

The analysis device 200 preferably comprises a guide apparatus 234 for movably and/or slidably guiding the receiving unit 230 and/or actuator unit 232 as shown schematically in FIG. 6. In particular, the guide apparatus 234 holds or guides the receiving unit 230 and/or actuator unit 232 such that said receiving unit 230 and/or actuator unit 232 can move and/or slide relative to the connection unit 231 and/or in the direction B2 or in the opposite direction.

In FIG. 6, the actuator movement in the direction B2 is the movement towards the connection unit 231, i.e., a closing movement or advancing movement.

In the view according to FIG. 6, the receiving unit 230 has been moved away from the connection unit 231. This constitutes the receiving position in which the cartridge 100 can be received and then ejected or removed. In FIG. 6, the cartridge 100 is partly received or slid in and is in a transfer position.

Once the receiving unit 230 has received the entire cartridge 100 and has been moved together therewith towards the connection unit 231, i.e., when advancement or closing has occurred, the cartridge 100 is positioned against or abuts the connection unit 231. In the following, this is also referred to as the test position of the receiving unit 230 and cartridge 100.

The receiving unit 230 is preferably biased or pre-tensioned into the receiving position, preferably by means of at least one spring 235.

The actuator unit 232 preferably comprises one or more actuators 205A, in particular in the form of fixed actuation elements or actuation pins, as shown schematically in FIG. 6. In the following, the moved-away or unactuated position of the actuator unit 232 as shown is also referred to as the initial position.

The actuator unit 232 is preferably biased or pre-tensioned into the initial position, preferably by means of at least one spring 236.

The actuator unit 232 can be moved out of the initial position by means of the drive apparatus 233 (relative to or) towards the connection unit 231 and/or receiving unit 230 and/or in the direction B2.

The guide apparatus 234 preferably comprises at least one guide element 234A, which is a guide rod in this case, for holding or guiding the actuator unit 232 and/or receiving unit 230 such that said actuator unit 232 and/or receiving unit 230 can in particular move linearly, in particular in the direction B2 of the actuator movement or in the direction opposite thereto.

The guide element 234A is preferably supported or mounted, at one end, on the connection unit 231 and/or is held or mounted, at the other end, on an abutment or rack 237 or stop 237A of the analysis device 200.

The analysis device 200 or the receiving unit 230 preferably comprises a lifting apparatus 238 in order for it to be possible for the cartridge 100 to enter the receiving unit 230 in a preferably vertical direction or in a receiving direction B3 or receiving movement and/or in order for it to be possible for said cartridge 100 to be ejected from or moved out of said unit 230 in the opposite direction and/or towards the top.

The receiving direction B3 preferably extends transversely and/or perpendicularly to the direction B2 of actuator movement or advancement movement.

FIG. 6 shows the cartridge 100 in its transfer position. In said transfer position, the cartridge 100 that has not yet been used is manually inserted into or transferred to the analysis device 200.

From the transfer position, the cartridge 100 is lowered and/or moved, by means of the lifting apparatus 238, into a position in which it is in a lower position and/or is received in its entirety in the receiving unit 230, as indicated by movement in the receiving direction B3.

Figure 7:
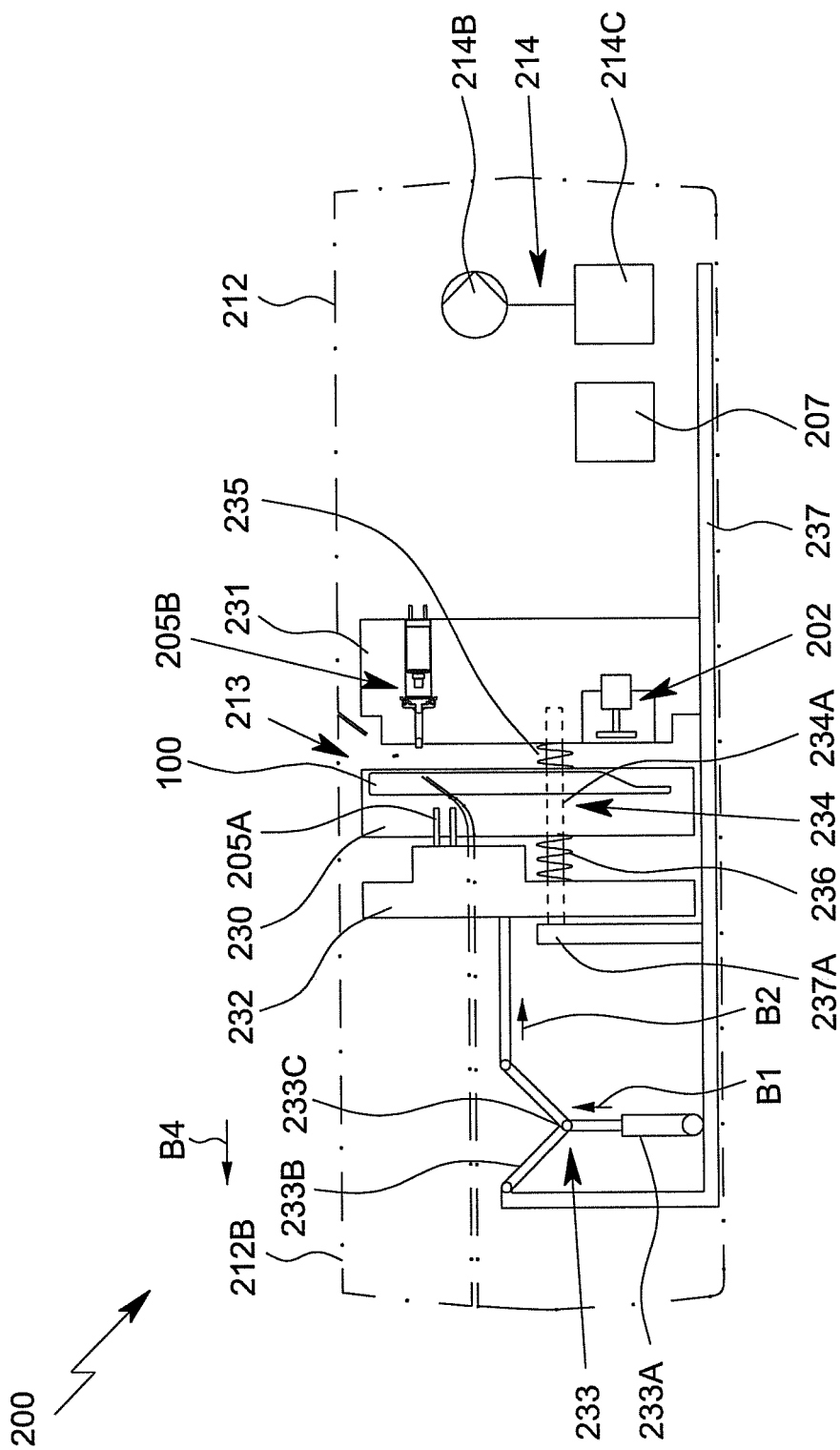
FIG. 7 is a schematic sectional view of the analysis device when the entire cartridge has been received and the housing is closed.

FIG. 7 is a schematic section through the cartridge 100 that corresponds to the section in FIG. 6, in which the cartridge is in its position in which it has been received in its entirety, the actuator unit 232 (still) being in the initial position and the receiving unit 230 (still) being in the receiving position, and the analysis device 200 or housing 212 or housing part 212B (already) being closed.

In order to close the analysis device 200 or the (outer or housing-side) opening 213 in the analysis device 200, in the example shown, the housing part 212B is moved or closed in a direction opposite to an opening direction B4.

The opening direction B4 preferably extends horizontally and/or in parallel with the direction B2 of the actuator movement or advancement movement.

The opening direction B4 preferably extends transversely and/or perpendicularly to the receiving direction B3.

Once the cartridge 100 has been received or brought in in this manner and the housing 212 of or the opening 213 in the analysis device 200 has preferably been closed, the cartridge 100 or the receiving unit 230 containing the cartridge 100 is moved, in a first step or period of movement, preferably towards the connection unit 231, in particular until the connection unit 231 and the cartridge 100 are connected in the desired manner and/or are in abutment in the desired manner and/or until the cartridge 100 is positioned on or against the connection unit 231 in the desired manner and/or until the cartridge 100 is clamped between the connection unit 231 and the receiving unit 230 in the desired manner, i.e., until the receiving unit 230 and thus also the cartridge 100 have reached the test position. This state is shown in the schematic section according to FIG. 8 that corresponds to the section in FIGS. 6 and 7.

Thus, the receiving unit 230, the connection unit 231 and/or the actuator unit 232 preferably can be moved relative to each other and/or along the direction B2 of the actuator movement (back and forth). In particular, the receiving unit 230 and/or the actuator unit 232 can be moved in the direction of and/or relative to the connection unit 231, as explained in greater detail in the following.

In the example shown, the connection unit 231 is preferably fixed and/or immoveable and/or stationary, in particular allowing a simple construction. However, it is also possible to design the connection unit 231 so as to be moveable, for example, similar or alternatively to the receiving unit 230.

Figure 8:
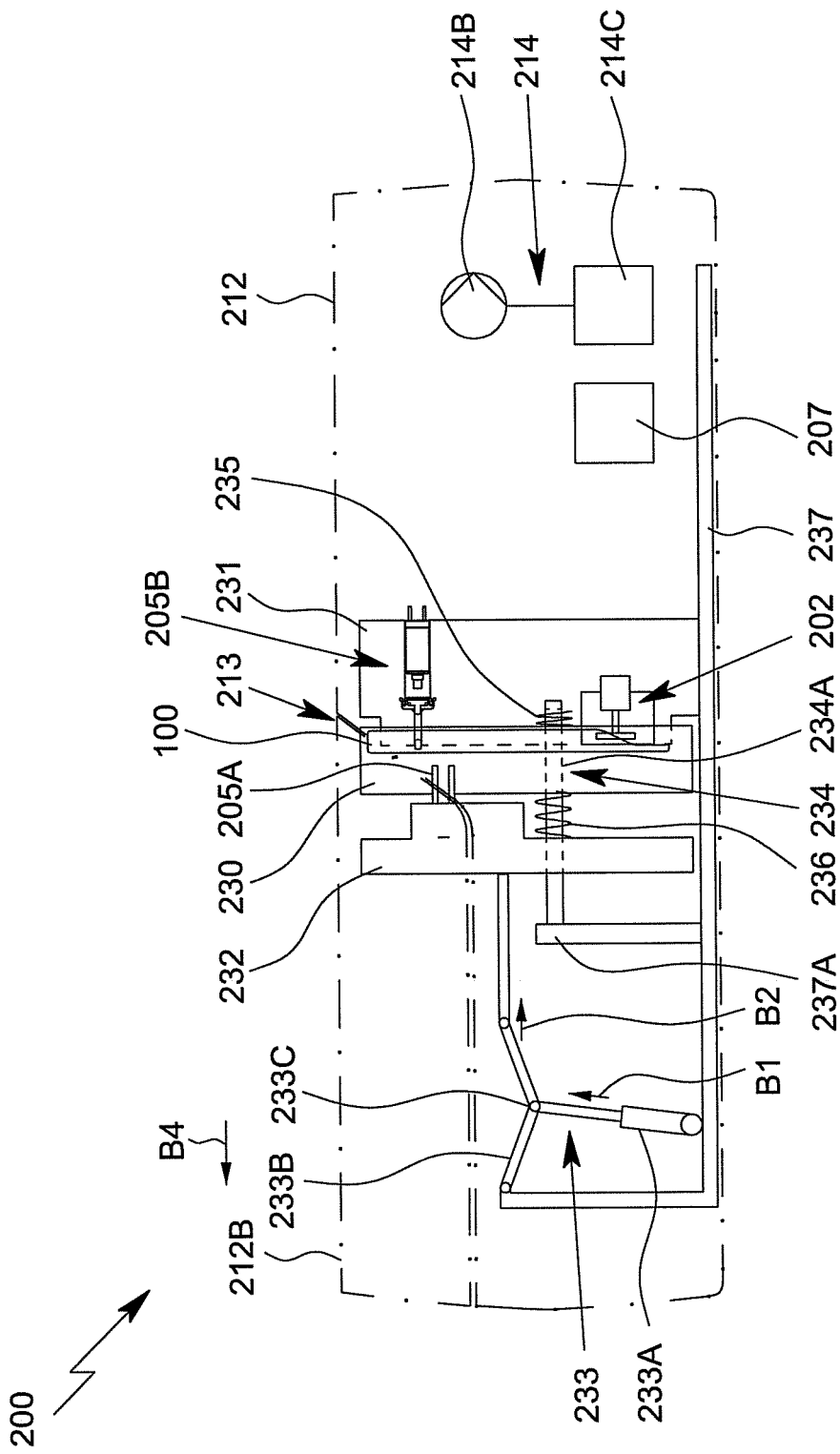
FIG. 8 is a schematic sectional view of the analysis device, showing the cartridge in a test position and showing unactuated valves.

In the state shown in FIG. 8, the actuator unit 232 has preferably not yet been moved relative to the receiving unit 230, but has preferably already been moved relative to the connection unit 231. This position of the actuator unit 232 is also referred to as the intermediate position.

Preferably, when the receiving unit 230 or cartridge 100 is being transferred or moved into the test position and/or preferably immediately thereafter, at least one valve 115A of the cartridge 100 is actuated and/or opened in an automatic and/or forced manner. Particularly preferably, a plurality or all of the valves 115A that, in principle, have to be actuated and/or opened for the test and/or that require a particularly high actuation force are actuated or opened in a forced manner. Said valves are actuated in particular by means of the actuator unit 232.

Figure 9:
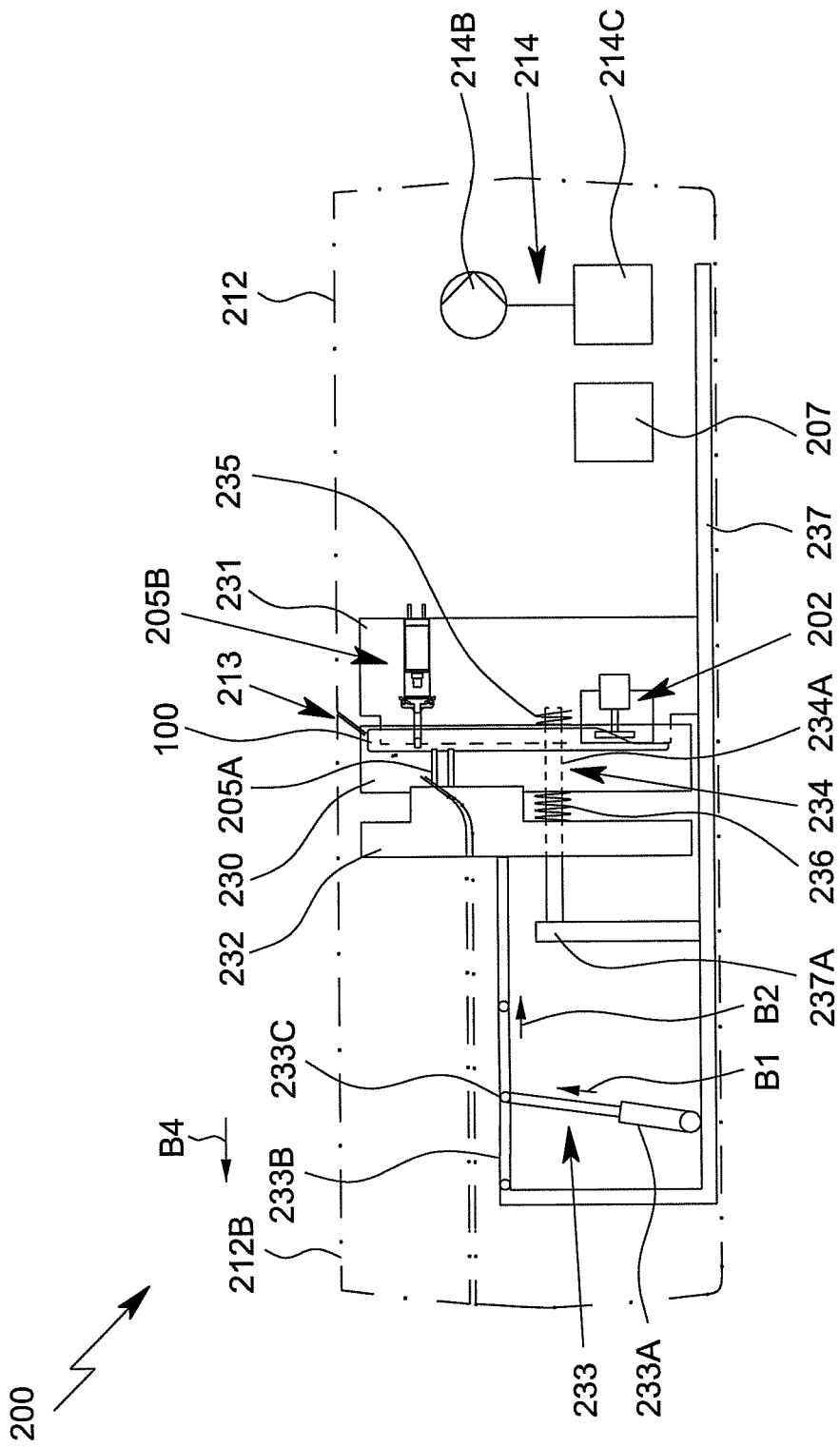
FIG. 9 is a schematic sectional view of the analysis device, showing the cartridge in the test position and showing actuated valves.

In a second step or period of movement or immediately after the test position has been reached, the actuator unit 232 is preferably moved relative to or into the receiving unit 230 such that the actuator unit 232 ultimately assumes an actuation position, as indicated in FIG. 9, in which position the actuator unit 232 actuates, particularly preferably forces open, the corresponding valves 115A of the cartridge 100 by means of the actuators 205A of said actuator unit 232.

The spring 235 that is arranged or acts between the receiving unit 230 and the connection unit 231 is also referred to as the first or weaker spring.

In particular, one end of the first spring 235 is supported on or coupled to the receiving unit 230 and the other end of said spring 235 is supported on or coupled to the connection unit 231.

The spring 236 that is arranged or acts between the actuator unit 232 and the receiving unit 230 or connection unit 231 is also referred to as the second or stronger spring. In particular, one end of said spring 236 is supported on or coupled to the actuator unit 232 and the other end of said spring 236 is supported on or coupled to the receiving unit 230.

The springs 235, 236 are preferably installed in a pretensioned state, and therefore it can be ensured that the return movement into the initial position, i.e., when the receiving unit 230 returns to the receiving position and/or the actuator unit 232 returns to the initial position, is in particular always reliable and/or automatic.

The first spring 235 is preferably designed and/or pretensioned so as to be weaker than the second spring 236, and therefore, during the advancement movement in the direction B2, the receiving unit 230 (together with the cartridge 100) is always initially (in the first step) moved out of the receiving position (FIG. 7) into the test position (FIG. 8) or towards the connection unit 231, the actuator unit 232 already being moved together therewith during this movement, however, not relative to the receiving unit 230, but instead only relative to the connection unit 231. Only thereafter, when the test position has been reached, is the actuator unit 232 moved (in the second step) relative to the receiving unit 230 and/or relative to the cartridge 100, in particular brought closer thereto, in order for the actuator unit 232 to finally be moved out of the intermediate position shown in FIG. 8 into the actuation position shown in FIG. 9.

The purpose of the first movement or the first step is in particular to receive the cartridge 100 in a clamped manner, to position the cartridge, to firmly mount the cartridge and/or to connect the cartridge.

The purpose of the second movement or the second step is in particular to actuate or open preferably a plurality of valves 115A of the cartridge 100. However, the actuator unit 232 can, alternatively or additionally, also be used for other purposes or forms of actuation and/or can be used to connect the cartridge 100 in further or other ways.

In the state shown in FIG. 9, the sample P is then tested. In this state, the cartridge 100 is connected in the necessary manner to the analysis device 200 or vice versa. However, the test can, in principle, also start in an earlier state, in particular as shown in FIG. 8, for example, when it is not necessary to actuate valves 115A, when it is only optionally necessary to actuate said valves or when it is only necessary to actuate said valves in the (further) test sequence.

The springs 235 and 236 are preferably designed as helical or coil springs.

The springs 235 and 236 are preferably of different spring hardnesses or spring stiffnesses. In particular, the second spring 236 is harder or stiffer than the first spring 235.

The spring 235 and/or 236 is preferably associated with the guide apparatus 234 and/or preferably surrounds the guide element 234A.

In particular, the two springs 235, 236 are arranged coaxially with respect to the direction B2 of actuator movement or advancement movement and/or with respect to the guide element 234A and/or are oriented such that their axes are in parallel with said movement direction B2 and/or said guide element 234A.

It is noted that, in the example shown, the actuator movement is preferably at least substantially parallel to the advancement movement by means of which the receiving unit 230 and/or actuator unit 232 is/are moved towards the connection unit 231, in particular both movements being in the direction B2. However, in principle, these movement directions can also extend obliquely to one another.

The drive apparatus 233 preferably acts on the receiving unit 230 either directly or indirectly.

In the example shown, the drive apparatus 233 preferably acts on the receiving unit 230 only indirectly, since the drive apparatus 233 engages in particular on the actuator unit 232 and acts on the receiving unit 230 by means of said actuator unit 232 or a spring coupling, in particular in order to bring about the desired advancement movement in the direction B2 or movement relative to the connection unit 231.

The actuator unit 232 is thus used for moving the receiving unit 230 relative to the connection unit 231, in particular in order to position, place or clamp the cartridge 100 on the connection unit 231, and/or for actuating or opening one or more valves 115A of the cartridge 100.

Preferably, the actuator unit 232 and the receiving unit 230 can be moved together in the first period of movement or step and can be moved relative to one another in the movement direction B2 in the second period of movement or step, in particular in order to move the cartridge 100 towards the connection unit 231 and in particular also in order to open one or more valves 115A.

The actuator unit 232 can preferably be moved counter to or against a spring force, in this case counter to or against the force of the spring(s) 235, 236, towards the receiving unit 230 and/or connection unit 231.

Preferably, just one single or common drive apparatus 233 is provided in order to move or slide the receiving unit 230 and the actuator unit 232. This provides for a particularly simple, compact and/or robust construction.

Particularly preferably, the actuator unit 232 and the receiving unit 230 perform a coupled movement, i.e., are motion-coupled, in this case by means of the springs 235 and 236.

However, some other type of coupling, for example, that uses gears, levers or a slotted link or the like, can also be used or carried out.

The drive apparatus 233 preferably operates in one direction, in this case in the closing direction B2, counter to or against a spring force. The opposite movement or return movement into the initial position can be performed in particular only by the spring force. This allows, for example, for a single-acting cylinder to be used as the drive 233A.

The spring force by means of which the receiving unit 230 can be moved towards the connection unit 231 is preferably smaller than the spring force by means of which the actuator unit 232 can be moved towards the receiving unit 230. Therefore, the desired coupled movement or the desired sequence of movements can be achieved in a simple manner, particularly preferably such that the cartridge 100 is initially positioned on, connected to and/or clamped on the connection unit 231 and only after this are one or more valves 115A of the cartridge 100 actuated or opened in a forced manner.

However, the coupled movement or the sequence of the two steps can also be achieved or solved by means of a different structure, optionally by means of just one single or common drive apparatus 233, as is the case in the preferred embodiment, or, alternatively, by means of separate drive apparatus for the different movements or steps.

The receiving unit 230 can preferably be moved relative to the connection unit 231 by means of a motor, in particular pneumatically.

The actuator unit 232 can preferably be moved relative to the connection unit 231 and/or receiving unit 230 by means of a motor, in particular pneumatically.

Valves 115A on the cartridge 100 are actuated in an in particular mechanical manner by the actuator unit 232 acting on the cartridge 100 or the valves 115A thereof, in the actuation position, by means of actuators 205A that are preferably fixed on the actuator unit 232. In this regard, the actuators 205A can optionally engage through apertures or through holes in the main body 101 if the valves 115A are arranged on the flat side of the cartridge 100 that is remote from the actuator unit 232, as is the case in the example shown.

The analysis device 200 or housing 212 preferably comprises or forms a rack 237 in order for it to be possible, for example, for the connection unit 231, the drive apparatus 233 and the guide apparatus 234 to be received in or held by the rack 237.

The rack 237 or guide apparatus 234 or drive apparatus 233 preferably forms a stop 237A, in order to limit the reverse movement of the actuator unit 232 and/or of the receiving unit 230 opposite to the advancement movement B2.

Figure 10:
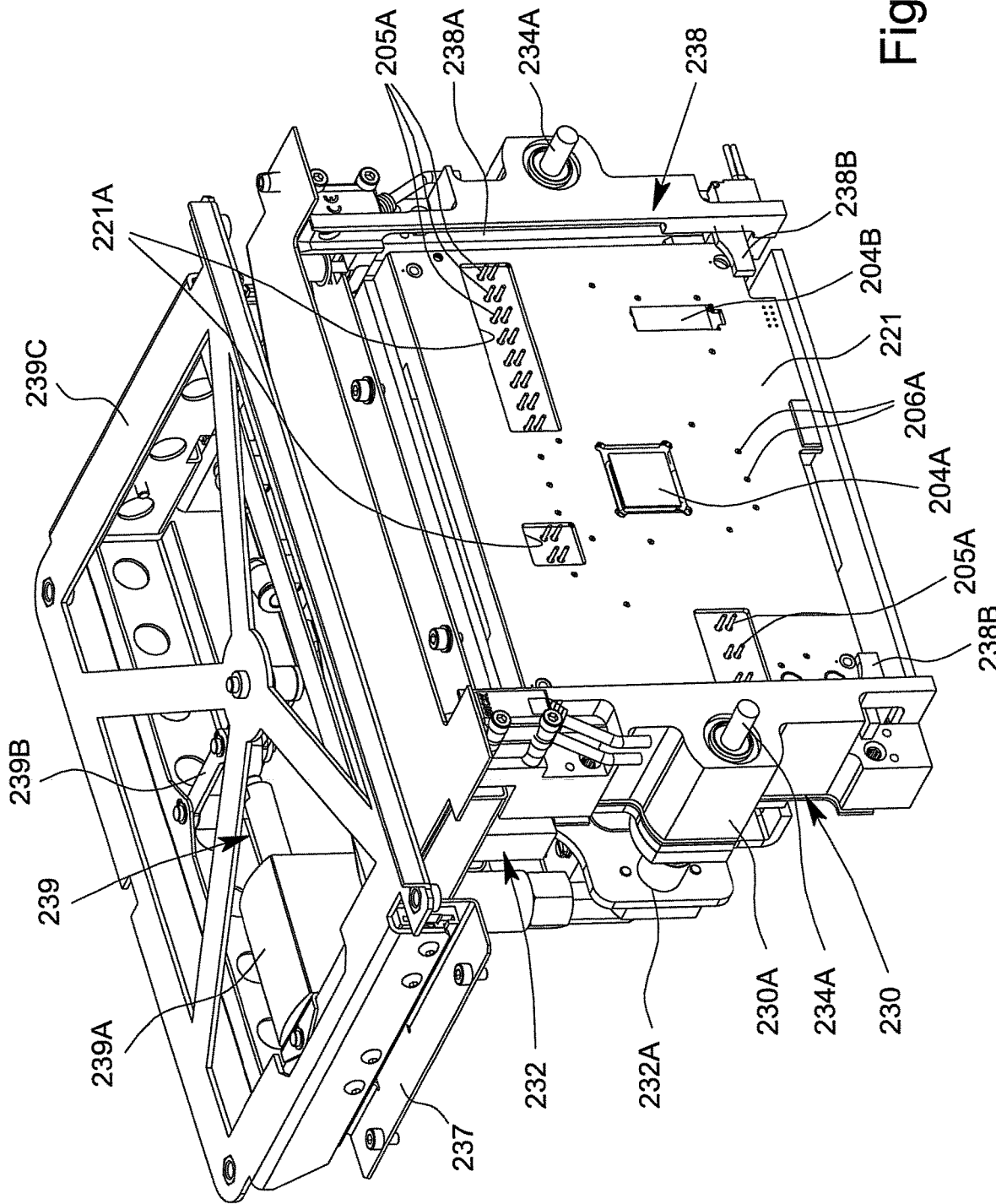
FIG. 10 is a perspective view of a receiving unit of the analysis device.

FIG. 10 is a perspective view of the receiving unit 230 when it does not contain the cartridge 100 and showing the actuator unit 232 arranged there behind.

The analysis device 200 preferably comprises an opening apparatus 239 for opening and closing the analysis device 200 or housing 212 or the opening 213, in particular by means of a motor and/or pneumatically. This is shown in FIG. 10.

The opening apparatus 239 preferably comprises a drive 239A, a gear mechanism 239B and/or a preferably frame-like support 239C. In particular, the support 239C is mounted and/or guided on the analysis device 200 or rack 237 or part thereof so as to be linearly movable and/or movable in the opening direction B4 or in the direction opposite thereto. The support 239C preferably supports the housing part 212B that can be opened.

By means of the opening apparatus 239, the housing part 212 can be moved preferably linearly, in particular in order to open in the opening direction B4 and in order to close in the opposite direction.

The gear mechanism 239B is preferably a toggle lever mechanism. However, other technical solutions are also possible.

The receiving unit 230 and in particular also the actuator unit 232 are preferably held and/or guided on both sides or on opposing sides by means of the guide apparatus 234, respectively, so as to be movable in the advancement direction B2 or movable in the opposite direction into a moved-away position. The arrangement for this movable guidance is preferably the same on both sides, and therefore the arrangement on just one side is explained in greater detail in the following.

The receiving unit 230 preferably comprises a bearing portion 230A for being movably supported on the guide apparatus 234 or the guide element 234A thereof. In particular, the bearing portion 230A forms or holds a bearing lug or a bearing sleeve through which the guide element 234A is guided. However, other structural solutions are also possible.

The actuator unit 232 preferably comprises a bearing portion 232A for being movably supported on the guide apparatus 234 or the guide element 234A thereof. In particular, the bearing portion 232A forms or holds a bearing lug or a bearing sleeve through which the guide element 234A is guided. However, other structural solutions are also possible.

One end of the (first) spring 235 is preferably supported or mounted, on the bearing portion 230A or a stop aimed thereby, and the other end of said spring 235 is supported or mounted on the connection unit 231, in particular on a bearing portion 231A of the connection unit 231.

The spring 235 is preferably received in part in the bearing portion 230A and/or 231A and/or radially guided by means of said bearing portion 230A and/or by means of the guide element 234A.

One end of the (second) spring 236 is preferably supported or mounted on the bearing portion 230A or a stop formed thereby, and/or the other end of said spring 236 is supported or mounted on the bearing portion 232A of the actuator unit 232.

The spring 236 is preferably received in part in the bearing portion 230A and/or 232A and/or radially guided by means of said bearing portion 230A and/or by means of the guide element 234A.

The guide element 234A preferably extends through the spring 235 and/or 236.

The receiving unit 230 and the lifting apparatus 238 are preferably arranged on both sides in the region of the narrow sides of the cartridge 100, which are in this case preferably vertically oriented, with the receiving unit 230 or lifting apparatus 238 on one side being at least substantially identical to the corresponding unit or apparatus on the other side, respectively. Therefore, the following description relates primarily to just one side.

The cartridge 100 is preferably held by the receiving unit 230 and/or lifting apparatus 238 only on the sides and/or on opposing sides, in particular the narrow sides.

The receiving unit 230 and/or lifting apparatus 238 preferably comprises a lateral, in particular groove-like, guide 238A and/or a retaining element 238B, as shown in FIG. 10.

The guide 238A is designed in particular to receive the cartridge 100 in the region of the edge 121.

The lifting apparatus 238 is designed in particular such that once the cartridge 100 has been manually slid in and/or received in part, said cartridge 100 is subsequently lowered and/or completely brought in from the transfer position (shown in FIG. 6), i.e., said cartridge 100 is received in its entirety by the lifting apparatus 238 and/or receiving unit 230. The cartridge 100 is received and/or lowered in this manner by the retaining elements 238B that are preferably arranged on the right-hand side and left-hand side or on both sides moving in a corresponding manner, in this case in the downward direction. FIG. 10 shows the lowered or lower position of the retaining elements 238B. In this position, the entire cartridge 100 is then received in the guides 238A or by the receiving unit 230, and therefore said cartridge 100 no longer projects upwards beyond the guides 238A or the receiving unit 230. This lowered position is shown in FIG. 7.

The lifting apparatus 238 and in particular the retaining elements 238B thereof engage the cartridge 100 from behind and/or support said cartridge 100 from below. However, other structural solutions are also possible.

The lifting apparatus 238 is preferably driven by means of a motor and operates in an in particular electrical or pneumatic manner.

The retaining elements 238B can be driven for example, by means of lead screws, a chain, a drive belt or the like.

The front 100A or the cover 102 of the cartridge 100 preferably points towards the receiving unit 230.

In particular, the receiving unit 230 has a contact surface for the cartridge 100, in particular the front 100A or cover 102 thereof, that is at least substantially planar, flat and/or continuous, in order to support the cartridge 100 in the test position in as even a manner as possible and/or over the largest possible surface area and/or in order to hold and/or clamp said cartridge 100 against the connection unit 231.

The receiving unit 230 preferably comprises or holds a printed circuitboard 221. The printed circuit board 221 preferably forms the contact and/or support surface for the cartridge 100 on the receiving side and/or flat side.

The printed circuit board 221 is preferably rigidly connected or fixed to the receiving unit 230.

The receiving unit 230 and/or printed circuit board 221 preferably comprises recesses 221A through which the actuators 205A or the actuator unit 232 can act on the cartridge 100 in order to make possible the desired actuation or opening of the valves 115A in the actuation position, as shown in FIG. 9.

In the sense of the present invention, a printed circuit board (PCB) is preferably a support or mount for electronic components, its purpose being in particular to mechanically mount and/or electrically connect said electronic components. Typically, a printed circuit board comprises a flat, planar element of an electrically isolating material, with conductive paths or tracks being arranged on said element. In particular, electronic components can be attached to the printed circuit board, for example, by soldering, and/or said components can be electrically connected with each other by means of the conductive paths.

In the example shown, the actuator unit 232 preferably comprises a plurality of fixed actuators 205A, in particular two groups of actuators 205A (right-hand side and center of FIG. 10) which actuate or open associated valves 115A of the cartridge 100 in the actuation position preferably in a forced manner. Said actuators 205A and/or valves 115A are in particular assigned to the storage cavities 108 in order to open said cavities.

Also large opening forces can be achieved by means of the drive apparatus 233, and therefore also valves 115A that close in a particularly tight manner and ensure a high level of tightness and thus also high storage stability can be used and initially opened.

The actuator unit 232 or the receiving unit 230 preferably comprises actuators 205A that can be actuated independently of the movement of the receiving unit 230 relative to the connection unit 231, independently of the movement of the actuator unit 232 towards the receiving unit 230 and/or independently of one another, which actuators are shown in FIG. 10 on the left-hand side of the printed circuit board 221 in the form of three adjacent pairs of pins, and are used in particular for opening the valves 115A assigned to the receiving cavity 104 or other valves, as required. Said actuators 205A comprise separate drives (not shown) for individual actuation. The inlet 104B, outlet 104C and intermediate connection 104D can thus be opened as required and on an individual basis.

The receiving unit 230 or printed circuit board 221 preferably comprises, holds or supports one or more temperature-control apparatus 204, in particular the or a reaction temperature-control apparatus 204A and/or the intermediate temperature-control apparatus 204B.

In particular, the temperature-control apparatus 204 are generally electrically operated Peltier elements.

The thermal contact surfaces of the temperature-control apparatus 204 are in particular at least substantially in the plane of the contact surface or on the flat side of the printed circuit board 221 that faces the cartridge 100 or connection unit 231.

The receiving unit 230 or printed circuit board 221 preferably comprises or supports the fluid sensors 206A, in order for it to be possible in particular to detect flow fronts of fluids in the cartridge 100 in the assigned sensor portions 116 when the cartridge 100 has been received.

In particular, the printed circuit board 221 preferably has, on the side that is not visible in FIG. 10, all of the electrical components required for controlling the temperature-control apparatus 204 arranged on the printed circuit board 221 and/or the electrical components of the fluid sensors 206 required for fluid detection and/or detection of flow fronts.

Figure 11:
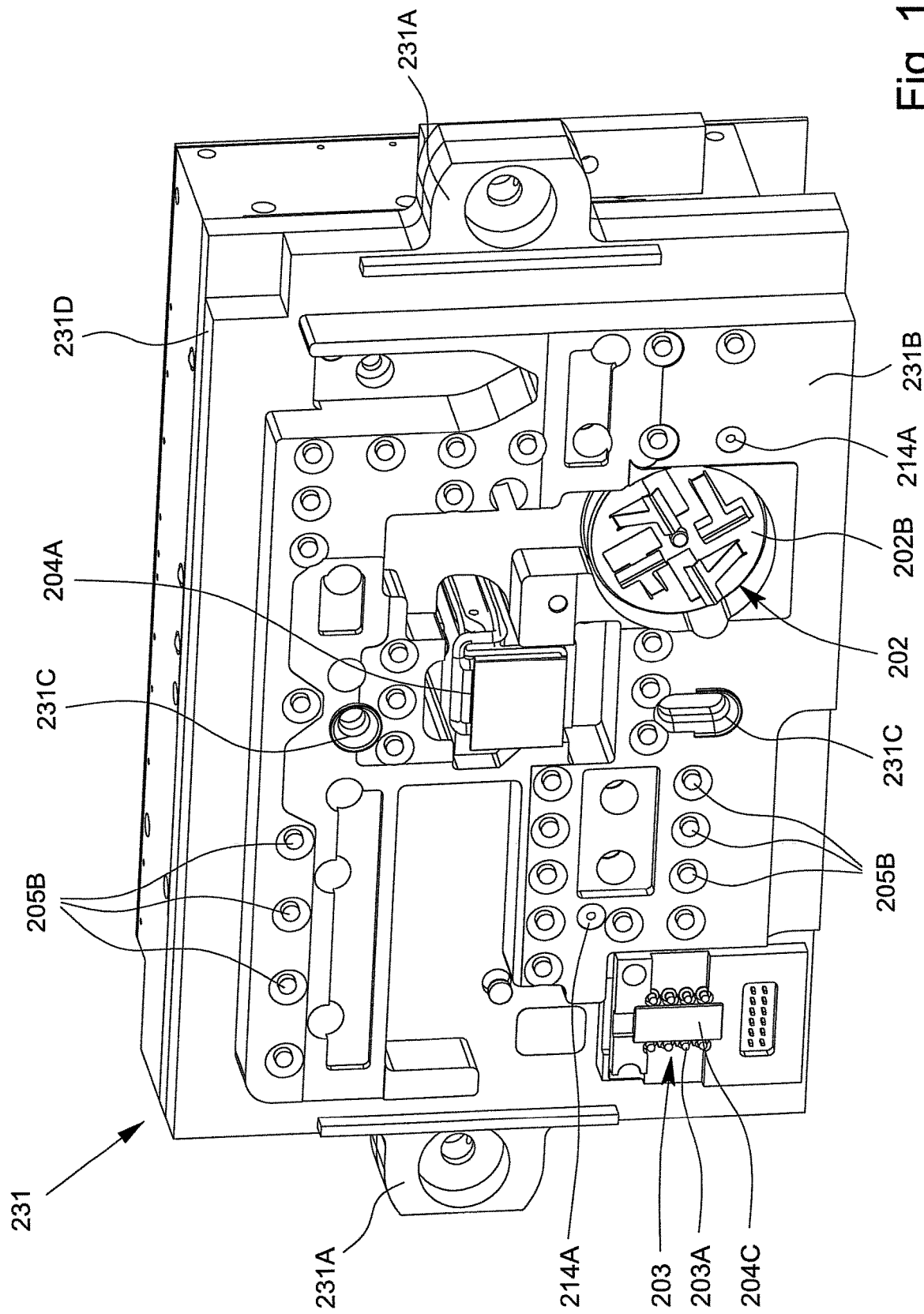
FIG. 11 is a perspective view of a connection unit of the analysis device.

FIG. 11 is a perspective view of the connection unit 231.

The connection unit 231 forms in particular an abutment or a contact surface for the cartridge 100 in the test position. In particular, the connection unit 231 comprises for this purpose corresponding contact surfaces or support regions 231B that support the cartridge 100 in the test position, preferably on the back 100B thereof.

The cartridge 100 is preferably positioned in a defined manner in the test position. This can be achieved in particular by means of corresponding engagement with the receiving unit 230 and/or the connection unit 231.

In the example shown, the connection unit 231 preferably comprises at least one engagement portion 231C, which is designed in particular as a recess or depression, in order to receive an associated positioning portion 126 in the test position and to thereby position the cartridge 100 in its main plane H.

Particularly preferably, two engagement portions 231C are formed on the connection unit 231 that interact with the two positioning portions 126 of the cartridge 100, in particular engage in the two positioning portions 126 in the test position.

Particularly preferably, one engagement portion 231C, in this case the lower engagement portion 231C, is in the form of an oblong hole, whereas the other, in this case the upper engagement portion 231C, is in the form of a circular hole. This provides for optimum positioning, without there being a force acting between the two positioning portions 126 that could lead to the cartridge 100 becoming jammed against the connection unit 231.

The connection unit 231 preferably comprises the lateral bearing portion 231A for the guide apparatus 234, in particular for receiving or bearing the guide element 234A and/or for guiding, supporting or mounting the (first) spring 235.

Particularly preferably, on the two opposing sides of the connection unit 231, bearing portions 231A of this kind are provided for the guide apparatus 234 that is arranged on both sides.

The connection unit 231 holds or comprises preferably one or more temperature-control apparatus 204, in this case in particular a reaction temperature-control apparatus 204A and/or the sensor temperature-control apparatus 204C.

The reaction temperature-control apparatus 204A of the connection unit 231 is preferably opposite the reaction temperature-control apparatus 204A of the receiving unit 230, and therefore the cartridge 100 and/or one or more reaction cavities 109 are received, arranged and/or clamped between the two temperature-control apparatus 204A such that the temperature-control apparatus 204A are positioned against or abut the cartridge 100 from opposing sides in the region of the reaction cavity/cavities 109. This allows the reaction cavity/cavities 109 to be temperature-controlled in an optimal manner. One of the two temperature-control apparatus 204A is preferably floatingly mounted and/or resiliently preloaded such that it is ensured that the temperature-control apparatus 204A are positioned against the cartridge 100 in an effective and/or reliable manner and/or over the entire surface thereof, and thus good thermal coupling is also ensured.

In particular, the temperature-control apparatus 204A of the connection unit 231 protrudes towards the cartridge 100 such that said apparatus engages in the recess, depression or region 101E of reduced wall thickness of the cartridge 100. The reduction in this wall thickness of the main body 101 in the region of the reaction cavity/cavities 109 is advantageous in that it allows improved thermal coupling and/or reduces the thermal resistance between the temperature-control apparatus 204A and a fluid in the reaction cavity 109.

The reaction cavities 109 also preferably have a very small cross section perpendicularly to the main plane H, i.e., the cross section of said cavities is very flat and said cavities have a surface extension that is at least substantially parallel to the main plane of extension H, and therefore the height of said cavities is low perpendicularly to the main plane H. This is conducive to good thermal coupling between the fluid in the reaction cavities 109 and the temperature-control apparatus 204A. The preferably flat design of the reaction cavities 109 is shown schematically in FIG. 3.

The sensor temperature-control apparatus 204C shown in FIG. 11 is preferably arranged and/or preferably projects such that, in the test position, the cartridge 100 is positioned against or abuts, with the sensor apparatus 113 and/or a central region 113H between the contacts 113E, the sensor temperature-control apparatus 204C. This produces a thermal coupling in order for it to be possible to temperature-control, in the desired manner, a sensor compartment and fluids located therein and reactions that are underway, in particular such that heat is transferred from the sensor temperature control apparatus 204C through the sensor apparatus 113 to a sensor compartment and fluids located therein, or vice versa.

The connection apparatus 203 or the contact elements 203A thereof are arranged in particular around the temperature-control apparatus 204C in order to electrically connect or contact the sensor apparatus 113 or the contacts 113E thereof.

The connection unit 231 preferably supports one, a plurality or all of the actuators 205B for actuating the assigned valves 115B of the cartridge 100. FIGS. 6 to 9 schematically show an actuator 205B of this kind. It can be seen from FIG. 11 that a plurality of actuators 205B are provided that can act on the cartridge 100 as required.

The actuators 205B are integrated in particular in a main body 231D of the connection unit 231. In the example shown, the main body 231D is preferably constructed or assembled from a plurality of plates or plate-shaped components. A preferred construction or design of the actuator 205B is explained in more detail later on this document with reference to FIG. 12.

The connection unit 231 preferably supports or holds the pump drive 202. In particular, the pump drive 202 is also integrated in the main body 231D, as shown in FIGS. 6-9 and 11.

In particular, a motor 202A of the pump drive 202 drives a pump head 202B of the pump drive 202.

The pump drive 202 and/or pump head 202B points towards the cartridge 100 and/or towards the receiving unit 230, and therefore the pump head 202B can act on the pump apparatus 112 of the cartridge 100 in the desired manner in the test position. In particular, a fluid (gas or liquid) can be conveyed in the pump apparatus 112 and thus in the cartridge 100 by rotating the pump head 202B. The pumping is thus controlled by operating the pump drive 202 and/or pump motor 202A accordingly.

The connection unit 231 also preferably comprises at least one connection element 214A, in this case two connection elements 214A, of the pressurized gas supply 214. The connection element 214A projects in particular in the manner of a tube and/or is or can be fluidically connected in the test position to an associated connection 129 of the cartridge 100.

The pump drive 202 or the pump motor 202A thereof and the temperature-control apparatus 204 are preferably operated electrically and in particular supplied with electrical power by the power supply 211 and/or controlled by the control apparatus 207.

A plurality of apparatus of the analysis device 200, such as the drive apparatus 233, the opening apparatus 239, the actuators 205B and/or the means for supplying pressurized working medium via the connection elements 214A, are preferably controlled and/or operated by the control apparatus 207 by activating corresponding valves and correspondingly supplying pressurized gas or pressurized air from the pressurized gas supply 214.

Following a test, the measurement results are read out electrically from the sensor apparatus 113 and processed either in the analysis device 200 or an external device.

Following the test, the used cartridge 100 is preferably ejected automatically.

In particular, the drive apparatus 233 is first taken out of or moved back from the actuated position, particularly preferably by means of spring force. However, it is also possible for the drive apparatus 233 to be actively moved back from said position and/or taken out of said position by means of a motor.

Initially, the actuator unit 232 is preferably first moved away again in the direction opposite the direction B2, preferably into the intermediate position. Alternatively, this can however occur at a later stage, after the receiving unit 230 has been moved away from the connection unit 231 and has in particular reached the receiving position.

However, it is preferable if the receiving unit 230 is only moved away or moved back into the receiving position after the actuator unit 232 has assumed the intermediate position.

Subsequently, the analysis device 200 or the opening 213 opens. For this purpose, the housing 212B is in particular moved in the opening direction B4.

The cartridge 100 can then be removed. In particular, the cartridge 100 is first ejected or moved out into the transfer position. This is carried out in particular by means of the lifting apparatus 238. The analysis device is then in the state shown in FIG. 6.

Finally, the used cartridge 100 can be manually removed from the transfer position and a new cartridge 100 (containing a new sample P) can be loaded for further testing.

If a new cartridge 100 has not been inserted or plugged in within a specified period of time, the analysis device 200 closes preferably automatically.

If a new cartridge 100 is inserted after the analysis device 200 has opened, the cartridge 100 is preferably moved automatically from the transfer position into the position in which it has been received in its entirety. For this purpose, the analysis device 200 preferably comprises a detection means for detecting whether a cartridge 100 has been received in part or inserted in part.

The analysis device 200 or the opening 213 closes in a preferably automatic manner only if no object, such as a cartridge 100 that has only been pushed part way in or, for example, an operator's finger, is present in the region of the opening 213. In particular, the analysis device 200 thus comprises a detection means for detecting objects located in the region of the opening 213 such that, if there is an object in this region, the device is automatically blocked or prevented from closing.

For reasons of safety, the analysis device 200 preferably is first closed before the drive apparatus 233 is actuated and/or before the receiving unit 230 is moved into the test position and/or before the cartridge 100 is mounted, positioned and/or clamped.

In the following, a preferred design of an actuator 205B of the analysis device 200 is explained in more detail with reference to FIG. 12. A plurality or all of the actuators 205B of the analysis device 200 are preferably constructed in a corresponding or similar manner.

Figure 12:
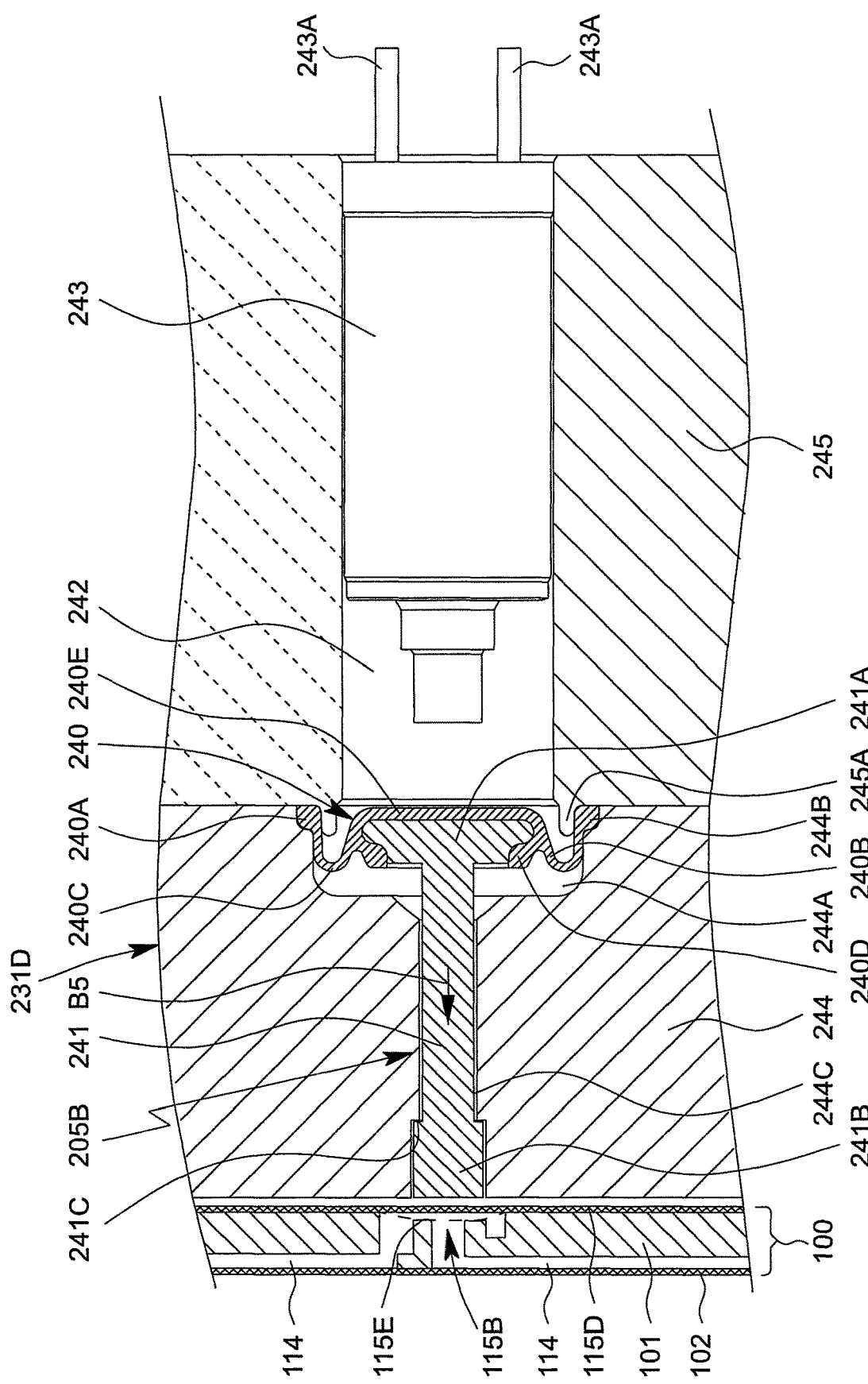
FIG. 12 is a schematic section through an actuator of the analysis device for actuating a valve of the cartridge.

FIG. 12 is an enlarged detail from FIGS. 6 to 9 shown in schematic section, showing a preferred construction or design of the actuator 205B for mechanically and/or pneumatically actuating an associated object, such as a valve 115B of the cartridge 100. However, the actuator 205B can also optionally be used for other forms of mechanical actuation or for other purposes.

The actuator 205B preferably comprises a membrane 240 and an actuation element 241 coupled, connected and/or fixed thereto, in particular the membrane 240 being designed to move the actuation element 241 in the actuation direction B5 or opposite thereto.

The actuation element 241 is preferably designed for actuation of the valve 115B, in particular by movement in the actuation direction B5.

Preferably, the membrane 240 is designed and/or provided for moving the actuation element 241. In other words, the membrane 240 thus forms a driving element for the actuation element 241 and/or serves as a drive for the actuation element 241.

In particular, the membrane 240 does not form a valve and/or a part of a valve. Preferably, the membrane 240 is independent and/or separate from the valve 115B and/or provided in addition to the valve 115B.

The membrane 240 and the valve 115B are preferably arranged on or at opposite sides of the actuation element 241 and/or sides of the actuation element 241 that are turned away from each other, in particular on end sides or faces.

The actuation element 241 is in particular designed in the manner of a pin or plunger or is elongate and/or rod-like. However, other shapes are also possible.

The membrane 240 is arranged on and/or connected to the actuation element 241 and/or holds the actuation element 241, preferably at an end side or face. One end of the actuation element 241 is preferably held solely by the membrane 240.

The membrane 240 is preferably loaded only pneumatically in order to move into an actuated position, in the actuation direction B5 and/or towards the cartridge 100 or the valve 115B.

Preferably, the membrane 240 can thus be pneumatically deformed, actuated and/or moved, in particular in the actuation direction B5 and/or in direction B5 and/or in direction of the valve 115B.

The membrane 240 is preferably elastic or resilient such that the actuation element 241 returns to the unactuated position preferably solely as a result of the elasticity or resilience of the membrane 240.

Preferably, the membrane 240 moves the actuation element 241 after actuation of the valve 115B, in particular opposite to the actuation direction B5 and/or into the unactuated position of the actuation element 241.

Preferably, a method of the present invention for testing the sample P provides that the actuation element 241 is moved in the actuation direction B5 by pneumatically operating or deforming the membrane 240. This allows a very simple, robust and/or cost-effect construction and/or reliable operation.

Preferably, the actuation element 241 is returned to the unactuated (non-actuated) position in particular solely as a result of the elasticity or resilience of the membrane 240.

FIG. 12 shows the actuator 205B in the unactuated state or initial state. In order to actuate the assigned valve 115B, the actuation element 241 can be moved in an actuation direction B5, which is in this case in particular towards the cartridge 100 and/or towards the value 115B and/or towards the receiving unit 230.

The actuation direction B5 extends in particular transversely or perpendicularly to the main plane H of the cartridge 100 and/or opposite to the direction B2 and/or movement of the actuator unit 232 and/or the actuators 205A which act(s) from the opposing sides on the cartridge 100 and/or on another group of valves 115A.

The actuator 205B is preferably (indirectly) operated pneumatically. In particular, the membrane 240 is acted on by a working medium, for example, pressurized gas or air, in order to bring about the desired movement, in this case in the actuation direction B5 or in the direction opposite thereto.

The actuation element 241 can thus be moved, in particular by means of the membrane 240, preferably so that a—in particular pneumatically generated or caused—movement or deforming of the membrane 240 causes or results in a movement of the actuation element 241, in particular in the actuation direction B5.

Consequently, it is preferably provided or envisaged, that the movement of the actuation element 241 be pneumatically induced, caused or achieved, and that the actuation, in particular the closing, of the valve 115 takes place by a mechanical effect of the actuation element 241 on the valve 115B.

In the example shown, a pressure chamber 242 is preferably arranged or formed on the side of the membrane 240 that is remote from the actuation element 241 in order for it to be possible for the working medium to act on the membrane 240 in the desired manner.

The membrane 240 is preferably at least substantially disc-shaped and/or provided with a round or circular outer contour.

The membrane 240 preferably has an edge 240A which is in particular peripheral and/or annular. The membrane 240 is preferably held and/or clamped at the edge 240A.

The edge 240A is preferably thickened and/or bead-like.

The membrane 240 preferably comprises an annular bellows 240B. The annular bellows 240B preferably has just one single and/or convex apex 240C, in particular on the side of the actuation element 241.

The annular bellows 240B is preferably arranged between the edge 240A and a central region or base 240E or a retaining region of the membrane 240.

The purpose of the central region or retaining region of the membrane 240 is in particular to fasten or hold the actuation element 241.

Particularly preferably, the actuation element 241 is guided and/or held by the membrane 240 on the end thereof and/or radially and/or transversely to the actuation direction B5.

The membrane 240 preferably holds the actuation element 241 in a form-fitting or interlocking manner, at least in the axial and/or radial direction.

The membrane 240 preferably comprises an undercut portion, in particular an annular lip 240D, in order to hold and/or guide the actuation element 241 and/or to connect the membrane 240 to the actuation element 241 or vice versa.

The actuation element 241 preferably comprises an engagement portion, in particular in the form of a preferably disc-shaped foot 241A, which can engage in the undercut portion of the membrane 240 and/or is held thereby.

In the example shown, the undercut portion or the annular lip 240D engages with or encompasses the preferably peripheral edge of the foot 241A, and therefore provides in a simple manner for a secure holding connection between the membrane 240 and the actuation element 241.

The membrane 240, the undercut portion or the annular lip 240D is preferably sufficiently elastic or resilient such that it is possible to produce the membrane 240 and the actuation element 241 separately and to subsequently connect said membrane 240 and actuation element 241.

Alternatively, however, it is also possible to integrally form the membrane 240 on the actuation element 241 and/or to connect said membrane 240 to said actuation element 241 in any other way, for example, by clamping, in a frictionally engaged and/or bonded manner, in particular by adhesion or welding.

The membrane 240 is preferably elastic or resilient, in particular made of an elastic or resilient material, particularly preferably plastics material and in particular silicone.

In the example shown, the membrane 240 is preferably formed in one piece and/or injection-molded.

The actuation element 241 is preferably made of a solid or rigid material, in particular plastics material or metal.

The actuation element 241 is preferably formed in one piece and/or as a solid construction.

If needed, the actuation element 241 can also be constructed from a plurality of parts.

The actuation element 241 is preferably coaxial with the membrane 240 and/or is arranged in and/or can be moved along the central axis of the membrane 240.

The longitudinal extension or axial extension of the actuation element 241 extends preferably in the actuation direction B5.

The actuator 205B is controlled in particular by means of an assigned control valve 243 which can also be considered part of the actuator 205B or an arrangement or assembly formed thereby, in particular together with the pressure chamber 242.

The actuator 205B is preferably integrated in the analysis device 200, in particular in the connection unit 231 and particularly preferably in the main body 231D.

In the example shown, the membrane 240 is preferably integrated or inserted in an in particular plate-shaped first component 244 or a recess or cut-out 244A formed therein, the recess or cut-out 244A in particular being arranged on a side remote from the cartridge 100 or receiving unit 230.

The actuation element 241 is preferably guided in a hole 244C which is formed in particular in the component 244 or adjoins the cut-out 244A, in particular in the centre thereof, and/or extends or opens towards the cartridge 100.

Preferably, the free or valve-side end, i.e., the end opposite the membrane 240, of the actuation element 241 is laterally and/or radially guided and is at the same time held so as to be axially movable in the actuation direction B5, in this case particularly preferably by the component 244 or the hole 244C. However, other structural solutions are also possible.

The actuation element 241 can optionally also have, on the valve-side end thereof, an enlarged or widened head 241B, as shown schematically in FIG. 12. Said head 241B can then correspondingly be held and/or guided in a radial or lateral direction.

The actuator 205B and/or the actuation element 241 optionally comprises a shoulder 241C or another form of stop in order to restrict the return movement into the (shown) unactuated position and/or in the direction opposite the actuation direction B5, in particular by form-fitting or interlocking abutment on a counter portion, in this case a step in the hole 244C and/or in the component 244. However, other structural solutions are also possible.

The membrane 240 or the edge 240A thereof is preferably held or integrated between the first component 244 and a second component 245 of the main body 231D.

Particularly preferably, the edge 240A is held or secured in a form-fitting or interlocking manner in an axial and/or radial direction.

In the example shown, the second component 245 preferably comprises a projection 245A which preferably engages inside the edge 240A and/or axially secures said edge.

The projection 245A is preferably annular or tubular.

The first component 244 or the cut-out 244A therein preferably comprises an axial recess or widening 244B towards the second component 245, and therefore an annular compartment for receiving the preferably thickened edge 240A of the membrane 240 is formed, in particular around the projection 245A, in order to preferably hold or secure said edge 240A in a form-fit or interlocking manner in both the axial and radial direction.

The membrane 240 extends from the edge 240A preferably at least in a substantially annular and/or tubular manner in the actuation direction B5 and/or in the axial direction and/or towards the actuation element 241 in order to preferably form then the annular bellows 240B, and/or until the apex 240C adjoins, and/or the membrane 240 is axially set back again in the opposite direction.

The central region of the membrane 240 then adjoins the annular bellows 240B and/or apex 240C, which central region preferably comprises or forms the preferably planar base 240E.

The annular lip 240D is preferably integrally formed peripherally and/or adjoins the annular bellows 240B preferably between the apex 240C and the base 240E.

The annular lip 240D preferably protrudes obliquely inwards towards the actuation element 241.

The annular lip 240D comprises at the free end thereof a preferably thickened annular region or edge which can engage in particular in a corresponding complementarily shaped peripheral depression in the edge of the foot 241A. This is conducive to the actuation element 241 being held in a form-fitting or interlocking manner.

The pressure chamber 242 is preferably also formed or arranged in the main body 231D, or in this case preferably in the second component 245 and/or (at least in part) in the first component 244 or the cut-out 244A therein.

The pressure chamber 242 is preferably assigned to the actuator 205B and/or formed thereby.

The control valve 243 is preferably assigned to the actuator 205B or pressure chamber 242 in order to supply the membrane 240 or the pressure chamber 242 with the working medium, i.e., pressurized gas or pressurized air, and/or to release or vent said working medium therefrom.

The control valve 243 is preferably controlled electrically. FIG. 12 schematically shows electrical connections 243A of the control valve 243.

The control valve 243 is preferably controlled by the analysis device 200 or the control apparatus 207.

In order to conduct the working medium and/or discharge the working medium, corresponding channels or fluidic connections are preferably provided that are formed in particular in the main body 231D or in the first and/or second component 244, 245. However, said channels or fluid connections are not shown in FIG. 12 for reasons of simplicity. Particularly preferably, corresponding supply ventilation channels and exhaust ventilation channels are formed in the second component 245, such that, by said channels interacting with the control valve 243, it is possible for pressurized gas or pressurized air to be correspondingly supplied and correspondingly exhausted or released.

When the pressure chamber 242 or the membrane 240 is supplied with the working medium, i.e., pressurized, the membrane 240 and thus also the actuation element 241 are moved out of the rest position or initial position shown in FIG. 12 in the actuation direction B5, i.e., in this case, to the left and/or towards the cartridge 100 and/or the assigned valve 115B. The actuated position for the head 241B of the actuation element 241 is indicated by dashed lines, in which actuated position the assigned valve 115B is preferably actuated, in particular closed.

The actuation thus preferably takes place by supplying the working medium, i.e., pneumatically. In principle, however, it is also possible for the opposite movement, i.e., from the actuated position into the rest or initial position, to be performed by supplying the working medium.

The return movement of the actuator 205B or of the membrane 240 and the actuation element 241 from the actuated position into the initial or rest position is preferably and particularly preferably exclusively brought about by the elasticity or resilience or by elastic or resilient restoring forces of the membrane 240, i.e., in this case once the pressure chamber 242 has been vented.

The control valve 243 is preferably inserted or integrated in a recess, hole or the like in the main body 231D or second component 245, which recess, hole or the like adjoins the pressure chamber 242. This provides for a very simple construction.

The control valve 243 is preferably designed as a switching valve in order for it to be possible to supply pressure and also in order to make venting possible. However, other structural solutions are also possible.

When there are a plurality of actuators 205B, each actuator 205B is preferably assigned its own control valve 243 in order for the actuators 205B to be controlled independently of one another. However, in principle, a plurality of actuators 205B can also be controlled by a common control valve 243.

The preferably plate-shaped construction or design of the main body 231D together with the actuators 205B and control valves 243 arranged therein provides for simple and cost-effective production and/or for a compact arrangement of the actuators 205B and thus also the valves 115E on the cartridge 100.

The preferably provided distribution or arrangement of the actuators 205B in the first component 244 and of the pneumatics and/or pressure supply, namely the pressure chambers 242, control valves 243 and/or supply and exhaust ventilation channels, in the second component 245 makes simple and/or cost-effective production and/or a compact arrangement possible.

When there are a plurality of actuators 205B, a plurality or all of the assigned control valves 243 are preferably supplied with the pressurized working medium via a common line or a common channel. The line or the channel is then preferably connected to the pressurized gas supply 214 or the pressure storage means 214C.

Accordingly, a common vent or a common vent channel or the like can also be provided.

FIG. 12 shows the associated cartridge 100 comprising an assigned valve 115B only schematically and by way of example. In this figure, the main body 101 comprises a relatively deep valve seat 115E on which a flexible wall 115D or film can be lowered or pressed down when the actuator 205B is being actuated, i.e., when the actuation element 241 is moved in the actuation direction B5 towards the valve seat 115E, as indicated by the dashed line in FIG. 12. This closes the valve 115B.

After the actuator 205B has been actuated and thus the actuation element 241 thereof has moved back into the initial position or unactuated position, the valve 115B can preferably automatically open again, in particular by means of the elastical or resilient return movement of the wall 115D. However, other structural solutions are also possible.

According to one aspect of the present invention the analysis device 200 comprises one or more pneumatically operated actuators 205B for one or more valves 115B on the cartridge 100, and a pneumatically operated apparatus, preferably including or being formed by the drive apparatus 233, for mounting positioning and/or clamping the cartridge 100, preferably during or for testing. This allows a very simple, robust and/or cost-effect construction and/or reliable operation.

In particular, the present invention relates also to any one of the following aspects which can be realized independently or in any combination, also in combination with any aspects described above or in the claims.

Analysis device 200 for testing, in particular, a biological sample P by means of a receivable cartridge 100, the analysis device 200 comprising at least one actuator 205B for mechanically actuating a valve 115B of the cartridge 100, characterized in that the actuator 205B comprises a pneumatically loaded membrane 240 and an actuation element 241 that is coupled to said membrane 241 and can be moved in a movement direction B5.

Individual aspects and features of the present invention and individual method steps and/or method variants may be implemented independently from one another, but also in any desired combination and/or order.

What is claimed is:

1. An analysis device for testing a sample, comprising:
a receivable cartridge having at least one valve in a body of the cartridge, the at least one valve includes a valve seat and a flexible wall disposed over the valve,
a holder for removably receiving the cartridge containing a sample to be tested or analyzed in the body thereof,
means to chemically, biologically and/or physically test and/or analyze the sample or a component thereof by means of a sample in the cartridge received in the analysis device, means for controlling testing of the sample in the cartridge, comprising:
at least one actuator having a movable actuation element for mechanically actuating the at least one valve of the cartridge, wherein the actuator comprises a pneumatically actuable membrane which is attached to a first side of the actuation element, and a second side of the actuation element is configured to move in an actuation direction toward the valve seat to releasbly press the flexible wall against the valve seat to close the at least one valve, and wherein the membrane is formed of a material able to return to the unactuated position opening the valve solely as a result of the elasticity or resilience of the membrane.

2. The analysis device according to claim 1, wherein one end of the actuation element distant from the at least one valve is held in the unactuated position solely by the membrane.

3. The analysis device according to claim 1, wherein the actuation element is guided or held by the membrane in a direction that is at least one of radial or transverse with respect to the actuation direction.

4. The analysis device according to claim 1, wherein the membrane is actuated solely pneumatically towards at least one of the at least one valve or an actuated position.

5. The analysis device according to claim 1, wherein the membrane has sufficient elasticity or resilience to return the actuation element to an unactuated position by itself.

6. The analysis device according to claim 1, wherein the membrane has a peripheral annular edge and is held at said peripheral annular edge.

7. The analysis device according to claim 1, wherein the membrane comprises an annular bellows.

8. The analysis device according to claim 7, wherein the annular bellows has a single convex apex on a side of the actuation element.

9. The analysis device according to claim 7, wherein the actuation element engages in or is held by an undercut portion of the membrane.

10. The analysis device according to claim 1, wherein the actuation element is laterally or radially guided in a region of a valve-side end of said actuation element.

11. The analysis device according to claim 1, wherein a pressure chamber is arranged on a side of the membrane that is remote from the actuation element, wherein an electrically controlled control valve is provided for controlling at least one supplying and venting of a pressurized working medium relative the pressure chamber.

12. The analysis device according to claim 1, wherein the holder comprises a pneumatically operated apparatus for at least one of mounting, positioning or clamping of the cartridge in the analysis device.

13. A method for testing a sample in an analysis device having at least one actuator having a movable actuation element for mechanically actuating a valve of a cartridge, the method comprising:
   providing the analysis device of claim 1,
   removably receiving the cartridge containing the sample in the analysis device,
   controlling testing of the sample in the cartridge by moving the actuation element in an actuation direction by pneumatically deforming a membrane and, thus, moving the actuation element against the valve of the cartridge, and
   chemically, biologically and/or physically testing and/or analyzing the sample or a component thereof by means of the cartridge received in the analysis device.

14. The method according to claim 13, wherein the membrane acts on one end of the actuation element distant from the valve of the cartridge.

15. The method according to claim 13, wherein the actuation element is returned to an unactuated position solely as a result of elasticity or resilience of the membrane.

16. The analysis device according to claim 1, wherein the analysis device comprises a plurality of actuators for independently actuating a plurality of valves on the cartridge.

17. The analysis device according to claim 1, wherein the analysis device comprises a housing that can be pneumatically opened for receiving or removing the cartridge in the holder and pneumatically closed after the cartridge is received.

18. The analysis device according to claim 1, wherein the analysis device comprises an electrically operated pressurized gas supply for pneumatically supplying the actuator.

19. The analysis device according to claim 1, wherein the actuation element engages in or is held by an undercut portion of the membrane.

* * * * *